US008396824B2

(12) United States Patent
Au

(10) Patent No.: US 8,396,824 B2
(45) Date of Patent: Mar. 12, 2013

(54) AUTOMATIC DATA CATEGORIZATION WITH OPTIMALLY SPACED SEMANTIC SEED TERMS

(75) Inventor: Lawrence Au, Vienna, VA (US)

(73) Assignee: QPS Tech. Limited Liability Company, Wilmington, DE (US)

( * ) Notice: Subject to any disclaimer, the term of this patent is extended or adjusted under 35 U.S.C. 154(b) by 948 days.

(21) Appl. No.: 11/806,260

(22) Filed: May 30, 2007

(65) Prior Publication Data

US 2007/0294200 A1  Dec. 20, 2007

Related U.S. Application Data

(63) Continuation-in-part of application No. 10/329,402, filed on Dec. 27, 2002, now Pat. No. 7,711,672, which is a continuation-in-part of application No. 09/085,830, filed on May 28, 1998, now Pat. No. 6,778,970.

(60) Provisional application No. 60/808,956, filed on May 30, 2006.

(51) Int. Cl.
*G06N 7/00* (2006.01)
(52) U.S. Cl. ........................ 706/55; 704/9; 707/999.01
(58) Field of Classification Search .................. 706/55; 707/999.01; 704/9
See application file for complete search history.

(56) References Cited

U.S. PATENT DOCUMENTS

| 4,429,385 A | 1/1984 | Cichelli et al. |
| 4,468,728 A | 8/1984 | Wang |
| 4,677,550 A | 6/1987 | Ferguson |
| 4,769,772 A | 9/1988 | Dwyer |
| 4,774,657 A | 9/1988 | Anderson et al. |
| 4,868,733 A | 9/1989 | Fujisawa et al. |
| 4,905,163 A | 2/1990 | Garber et al. |
| 4,914,569 A | 4/1990 | Levine et al. |
| 4,914,590 A | 4/1990 | Loatman et al. |
| 5,043,872 A | 8/1991 | Cheng et al. |
| 5,056,021 A | 10/1991 | Ausborn |
| 5,095,458 A | 3/1992 | Lynch et al. |
| 5,099,425 A | 3/1992 | Kanno |
| 5,111,398 A | 5/1992 | Nunberg et al. |
| 5,123,057 A | 6/1992 | Verly et al. |
| 5,155,825 A | 10/1992 | Moughanni et al. |
| 5,202,986 A | 4/1993 | Nickel |
| 5,299,125 A | 3/1994 | Baker et al. |
| 5,317,507 A * | 5/1994 | Gallant .................... 715/260 |

(Continued)

FOREIGN PATENT DOCUMENTS

| EP | 1288794 | 3/2003 |
| EP | 1612704 | 1/2006 |

(Continued)

OTHER PUBLICATIONS

"Noun-phrase co-occurrence statistics for semiautomatic semantic lexicon construction", Brian Roark, Eugene Charniak, Internation Conf on Computational Linguistics, Proc. of the 17th Intl Conf., vol. 2, p. 1110-1116, 1998.*

(Continued)

*Primary Examiner* — Kakali Chaki
*Assistant Examiner* — Mai T Tran
(74) *Attorney, Agent, or Firm* — Turocy & Watson, LLP

(57) ABSTRACT

A method and system for automatic data categorization in response to a user query. A document set is retrieved in response to the user query. A semantic parser parses the document set and produces semantic term-groups by parsing a semantic network of nodes. A seed ranker produces a plurality of advantageously spaced semantic seeds based on the semantic term-groups. A category accumulator stores the advantageously spaced semantic seeds. The semantic network of nodes is augmented with the advantageously spaced semantic seeds.

26 Claims, 12 Drawing Sheets

U.S. PATENT DOCUMENTS

| | | | |
|---|---|---|---|
| 5,321,608 | A | 6/1994 | Namba et al. |
| 5,386,556 | A | 1/1995 | Hedin et al. |
| 5,434,777 | A | 7/1995 | Luciw |
| 5,479,563 | A | 12/1995 | Yamaguchi |
| 5,528,491 | A | 6/1996 | Kuno et al. |
| 5,598,560 | A | 1/1997 | Benson |
| 5,615,296 | A | 3/1997 | Stanford et al. |
| 5,625,767 | A | 4/1997 | Bartell et al. |
| 5,625,814 | A | 4/1997 | Luciw |
| 5,628,011 | A | 5/1997 | Ahamed et al. |
| 5,630,125 | A | 5/1997 | Zellweger |
| 5,644,740 | A | 7/1997 | Kiuchi |
| 5,664,181 | A | 9/1997 | Velissaropoulos et al. |
| 5,694,590 | A | 12/1997 | Thuraisingham et al. |
| 5,721,895 | A | 2/1998 | Velissaropoulos et al. |
| 5,742,284 | A | 4/1998 | Duggan et al. |
| 5,752,016 | A | 5/1998 | Whittaker et al. |
| 5,778,223 | A | 7/1998 | Velissaropoulos et al. |
| 5,794,050 | A | 8/1998 | Dahlgren et al. |
| 5,802,508 | A | 9/1998 | Morgenstern |
| 5,809,269 | A | 9/1998 | Favot et al. |
| 5,826,256 | A | 10/1998 | Devanbu |
| 5,829,002 | A | 10/1998 | Priest |
| 5,870,751 | A | 2/1999 | Trotter |
| 5,894,554 | A | 4/1999 | Lowery et al. |
| 5,901,100 | A | 5/1999 | Taylor |
| 5,937,400 | A | 8/1999 | Au |
| 5,940,821 | A * | 8/1999 | Wical ................................. 1/1 |
| 5,963,940 | A | 10/1999 | Liddy et al. |
| 5,974,412 | A | 10/1999 | Hazlehurst et al. |
| 6,006,221 | A | 12/1999 | Liddy et al. |
| 6,154,213 | A | 11/2000 | Rennison et al. |
| 6,179,491 | B1 | 1/2001 | Choi et al. |
| 6,219,657 | B1 | 4/2001 | Hatayama |
| 6,233,575 | B1 | 5/2001 | Agrawal et al. |
| 6,256,623 | B1 | 7/2001 | Jones |
| 6,263,352 | B1 | 7/2001 | Cohen |
| 6,269,335 | B1 | 7/2001 | Ittycheriah et al. |
| 6,304,864 | B1 | 10/2001 | Liddy et al. |
| 6,356,906 | B1 | 3/2002 | Lippert et al. |
| 6,405,162 | B1 | 6/2002 | Segond et al. |
| 6,430,531 | B1 | 8/2002 | Polish |
| 6,442,522 | B1 | 8/2002 | Carberry et al. |
| 6,446,061 | B1 | 9/2002 | Doerre et al. |
| 6,446,083 | B1 | 9/2002 | Leight et al. |
| 6,463,430 | B1 | 10/2002 | Brady et al. |
| 6,499,021 | B1 | 12/2002 | Abu-Hakima |
| 6,609,091 | B1 | 8/2003 | Budzinski |
| 6,665,658 | B1 | 12/2003 | DaCosta et al. |
| 6,675,159 | B1 | 1/2004 | Lin et al. |
| 6,675,205 | B2 | 1/2004 | Meadway et al. |
| 6,684,201 | B1 | 1/2004 | Brill |
| 6,778,970 | B2 | 8/2004 | Au |
| 6,778,975 | B1 | 8/2004 | Anick et al. |
| 6,826,568 | B2 | 11/2004 | Bernstein et al. |
| 6,871,199 | B1 | 3/2005 | Binnig et al. |
| 6,931,397 | B1 | 8/2005 | Sundaresan |
| 7,117,199 | B2 * | 10/2006 | Frank et al. .......................... 1/1 |
| 7,152,031 | B1 | 12/2006 | Jensen et al. |
| 7,493,333 | B2 * | 2/2009 | Hill et al. ............................. 1/1 |
| 7,689,629 | B1 | 3/2010 | Baatz et al. |
| 2002/0059289 | A1 | 5/2002 | Wenegrat et al. |
| 2002/0133347 | A1 | 9/2002 | Schoneburg et al. |
| 2003/0028367 | A1 | 2/2003 | Chalabi |
| 2003/0037073 | A1 | 2/2003 | Tokuda et al. |
| 2003/0041047 | A1 | 2/2003 | Chang et al. |
| 2003/0167276 | A1 | 9/2003 | Simpson et al. |
| 2003/0217052 | A1 | 11/2003 | Rubenczyk et al. |
| 2004/0059708 | A1 | 3/2004 | Dean et al. |
| 2004/0117352 | A1 | 6/2004 | Schabes et al. |
| 2004/0267709 | A1 * | 12/2004 | Ji et al. ............................... 707/3 |
| 2005/0065773 | A1 | 3/2005 | Huang et al. |
| 2005/0108001 | A1 | 5/2005 | Aarskog |
| 2005/0149510 | A1 | 7/2005 | Shafrir |
| 2005/0210009 | A1 | 9/2005 | Tran |
| 2006/0179074 | A1 | 8/2006 | Martin et al. |
| 2006/0235689 | A1 | 10/2006 | Sugihara et al. |
| 2006/0242180 | A1 | 10/2006 | Graf et al. |
| 2007/0250497 | A1 | 10/2007 | Mansfield et al. |

FOREIGN PATENT DOCUMENTS

| | | |
|---|---|---|
| GB | 2302188 | 1/1997 |
| JP | 2006500698 A | 1/2006 |
| WO | 0180075 A1 | 10/2001 |
| WO | 2004029827 | 4/2004 |
| WO | 2004090674 | 10/2004 |
| WO | 2005050513 | 6/2005 |
| WO | 2005050513 A1 | 6/2005 |

OTHER PUBLICATIONS

OA dated Jan. 26, 2010 for U.S. Appl. No. 11/866,901, 40 pages.

OA dated Jan. 4, 2010 for U.S. Appl. No. 11/806,261, 37 pages.

Official Action dated Jan. 11, 2008 in U.S. Appl. No. 11/503,938, 22 pages.

U.S. Appl. No. 60/342,360, filed on Dec. 27, 2001 in the name of Lawrence Au.

Rada et al., "Development and Application of a Metric on Semantic Nets" IEEE Tran Systems Man and Cybernetics, vol. 19, No. 1, pp. 17-30, 1989.

Mariani "Recent Advances in Speech Processing" IEEE, pp. 429-440, 1989.

Kiyoki et al., "A Fast Algorithm of Sematic Associative Search for Databases and Knowledge Bases", Information Modelling and Knowledge Bases, VII, IOS Press, pp. 44-58, 1996.

Bellegarda, "A Multispan Language Modeling Framework for Large Vocabulary Speech Recognition", IEEE Trans on Speech and Audio Processing, vol. 6, No. 5, pp. 456-467, Sep. 1998.

Chan et al., "Symbolic Connectionism in Natural Language Disambiguation", IEEE Trans Neural Networks, vol. 9, No. 5, pp. 739-755, 1998.

Shapiro "Generalized Augmented Transistion Network Grammars for Generation from Semantic Networks", ACM Proceedings of the 17th Annual Meeting on Association for Computational Linguistics, 1979, pp. 25-29.

Jiang "Semantic Similarity Based on Corpus Statistics and Lexical Taxonomy", Proceedings of International Conference Research on Computational Linguistics, Taiwan, 1997, pp. 1-15.

Simmons "Generating English Discourse from Semantic Networks", Communications of the ACM, vol. 5, No. 10, pp. 891-905, Oct. 1972.

Rabiner "Applications of Speech Recognition in the Area of Telecommunications" IEEE, pp. 501-510, 1997.

Anick "Integrating Natural Language Processing and Information Retrieval in a Troubleshooting Help Desk" IEEE, pp. 9-17, Dec. 1993.

Knuth "The Art of Computer Programming: Sorting and Searching", Addison-Wesley, Copyright 1973; pp. 170-178, 346-360, 472-505, 552-559, and 680-687.

Aho et al., "Data Structures and Algorithms", Addison-Wesley, Copyright 1983; pp. 107-151, 163-169, and 246-250.

Kruse "Data Structures and Programming Design", Prentice Hall, Copyright 1984; pp. 40-83, 93-100 and 377-382.

Sedgewick, Algorithms, Addison-Wesley 1983; pp. 213-223.

Kolodner "Retrieval and Organizational Strategies in Conceptual Memory", pp. 32-43, pp. 102-109, Copyright 1984.

Official Action dated Jan. 10, 2008 issued in U.S. Appl. No. 11/503,898, 20 pages.

Response to Official Action dated Jan. 10, 2008 filed in U.S. Appl. No. 11/503,898, 20 pages, filed Jun. 10, 2008.

Official Action dated Aug. 14, 2008 issued in U.S. Appl. No. 11/503,898, 20 pages.

Response to Official Action dated Aug. 14, 2008 in U.S. Appl. No. 11/503,898, 12 pages, filed Dec. 15, 2008.

Notice of Allowance issued in U.S. Appl. No. 11/503,898 dated Dec. 23, 2008, 10 pages.

Official Action dated Jan. 11, 2008 issued in U.S. Appl. No. 11/503,906, 23 pages.

Response to Official Action dated Jan. 11, 2008 filed in U.S. Appl. No. 11/503,906, filed Jun. 10, 2008, 23 pages.

Official Action dated Aug. 15, 2008 issued in U.S. Appl. No. 11/503,906, 24 pages.
Response to Official Action dated Aug. 15, 2008 issued in U.S. Appl. No. 11/503,906, 14 pages, filed Dec. 15, 2008.
Notice of Allowance issued in U.S. Appl. No. 11/503,906 dated Jan. 9, 2009, 11 pages.
Official Action dated Jan. 10, 2008 in U.S. Appl. No. 11/503,900, 21 pages.
Official Action dated Jan. 11, 2008 in U.S. Appl. No. 11/503,901, 22 pages.
Official Action dated Jan. 11, 2008 in U.S. Appl. No. 11/503,902, 20 pages.
Official Action dated Oct. 26, 2005 issued in U.S. Appl. No. 10/329,402, 16 pages.
Response to Official Action dated Oct. 26, 2005 filed in U.S. Appl. No. 10/329,402, filed Mar. 24, 2006, 21 pages.
Response to Official Action dated Jun. 19, 2006 filed in U.S. Appl. No. 10/329,402, filed Jun. 29, 2006, 9 pages.
Official Action dated Oct. 6, 2006 issued in U.S. Appl. No. 10/329,402, 17 pages.
Response to Official Action dated Oct. 6, 2006 filed in U.S. Appl. No. 10/329,402, filed Feb. 2, 2007, 13 pages.
Official Action dated Apr. 18, 2007 issued in U.S. Appl. No. 10/329,402, 19 pages.
Response to Official Action dated Apr. 18, 2007 filed in U.S. Appl. No. 10/329,402, filed Oct. 18, 2007, 10 pages.
Response to Official Action dated Dec. 26, 2007 filed in U.S. Appl. No. 10/329,402, filed Apr. 28, 2008, 10 pages.
Official Action dated Jul. 28, 2008 issued in U.S. Appl. No. 10/329,402, 4 pages.
Response to Official Action dated Jul. 28, 2008 filed in U.S. Appl. No. 10/329,402, 3 pages filed Oct. 24, 2008.
Official Action dated Jan. 22, 2009 issued in U.S. Appl. No. 10/329,402, 2 pages.
Response to Official Action dated Jan. 22, 2009 issued in U.S. Appl. No. 10/329,402, 4 pages filed Mar. 23, 2009.
International search report and written opinion for application No. PCT/US2007/080332, mailed Apr. 11, 2008.
Proceedings of the 17th Annual Meeting on Association for Computational Linguistics, 1979. Conference.
Conference Research on Computational Linguistics, Taiwan, 1997, 11 pages, last accessed on Oct. 7, 2009, Aug. 22-24, 1997.
Schmidt. Trace Based Abstract Interpretation of Operational Semantics. LISP and Symbolic Computation, vol. 10, No. 3. (May 1, 1998), pp. 1-36. http://www.google.co.in/url?sa=t&source=web&cd=2 &ved=0CCEQFjAB&url=http%3A%2F%2Fciteseerx.ist.psu.edu%2Fviewdoc%2Fdownload%3Fdoi%/3D10.1.1.69.6270%26rep%3Drep1%26type%3Dpdf&rct=j&q=Trace-Based%20Abstract%20Interpretation%20of%20Operational%20Semantics%.
Miller. The Magical Number Seven, Plus or Minus Two Some Limits on Our Capacity for Processing Information. Psychological Review, 1956, vol. 63, pp. 81-97. http://www.musanim.com/miller1956/. Last accessed Dec. 22, 2010, 19 pages.
Wright. Reinforcement Learning and Animat Emotions. CSRP-96-4, Jan. 1996. http://citeseerx.ist.psu.edu/viewdoc/summary?doi=10.1.1.45.5931. Last accessed Dec. 22, 2010, 16 pages.
Kaiser, et al. Emotion Research and AI: Some Theoretical and Technical Issues. http://www.unige.ch/fapse/emotion/members/kaiser/rai4.pdf. Last accessed Dec. 22, 2010, 16 pages, Geneva Studies in Emotion & Communication, 1994.
OA dated Oct. 19, 2010 for U.S. Appl. No. 11/806,261, 19 pages.
Kolodner. "Case-Based Reasoning", pp. 221-245 and 346-347, Copyright 1993.
Qing Ma. "Connectionist Realization of Semantic Networks Using an Adaptive Associative Memory AAM", IEEE Proceedings of International Conference on Neural Networks, Nov.-Dec. 1995, 6 pages.
Bringmann, et al., "A Semantic Network Representation of Personal Construct Systems", IEEE Transactions on System, Man and Cybernetics, Sep.-Oct. 1992. pp. 1161-1168.
Pinker. "The Language Instinct", pp. 85, 88, 119, 187-188, 196-201, 227 and 234, Copyright 1994.
CN OA issued Jan. 19, 2011 for Chinese Patent Application No. 200780043235.7, 8 pages.
KR OA issued Jan. 14, 2011 for Korean Patent Application No. 2009-7009292, 3 pages.
OA dated Mar. 2, 2011 for U.S. Appl. No. 11/866,901, 27 pages.
OA dated Feb. 17, 2011 for U.S. Appl. No. 11/806,261, 23 pages.
Non Final Office Action dated Jul. 22, 2010 for U.S. Appl. No. 11/866,901, 23 pages.
OA dated Apr. 15, 2011 for U.S. Appl. No. 12/577,159, 52 pages.
OA dated May 13, 2011 for U.S. Appl. No. 12/577,160, 43 pages.
OA dated May 7, 2012 for U.S. Appl. No. 11/806,261, 37 pages.
OA dated Oct. 24, 2011 for U.S. Appl. No. 12/577,159, 29 pages.
OA dated Dec. 13, 2011 for U.S. Appl. No. 12/715,968, 24 pages.
OA dated Aug. 16, 2011 for U.S. Appl. No. 11/866,901, 28 pages.
OA dated Aug. 4, 2011 for U.S. Appl. No. 11/806,261, 28 pages.
OA dated Jun. 29, 2011 for U.S. Appl. No. 12/715,968, 51 pages.
Office Action dated Aug. 31, 2012 for U.S. Appl. No. 11/866,901, 43 pages.

* cited by examiner

Subcategory Output to User

Semantic Group Output to User

AUTOMATIC DATA CATEGORIZATION WITH OPTIMALLY SPACED SEMANTIC SEED TERMS

CROSS-REFERENCE TO RELATED APPLICATIONS

This application claims the benefit of U.S. Provisional Application No. 60/808,956, filed May 30, 2006. This application is also a continuation-in-part of U.S. patent application Ser. No. 10/329,402, filed Dec. 27, 2002 (now U.S. Pat. No. 7,711,672), which is a continuation-in-part of U.S. patent application Ser. No. 09/085,830, filed May 28, 1998 (now U.S. Pat. No. 6,778,970). Each of the above applications is incorporated by this reference in its entirety herein.

BACKGROUND OF THE INVENTION

To quickly search the vast amount of stored information available from computers, researchers have attempted to summarize that information using methods which automatically categorize information. Such summaries are automatically created by parsing the stored information itself, grouping the data therein into categories, and labeling these categories with terms to be understood by people wishing to know what is in the data.

One advantage of these automatic methods is that new categories can be created with small pre-existing taxonomies that partially cover the stored information so that the new categories will cover part of the stored information that has not been partially covered by the pre-existing taxonomies. Another advantage is that the category labels themselves serve to either remind people of useful search terms, or suggest ways in which the data itself can be succinctly described.

Both advantages are useful in search engine web portals and other similar user interfaces for people searching for information amid large data stores, such as the world wide web or other large data repositories. There are frequent occurring flaws in these automatic methods. One flaw is that the automatically generated categories may not correspond to major taxonomic branches, which people have in mind. For instance, an automatic categorization of "ears" might result in categories of "rental cars," "new cars" and "used cars" whereas a person might have in mind a taxonomy of "sport-utility vehicle," "sports cars," "station wagons" and "sedans."

Another flaw is that the automatically generated categories may be too closely related to major taxonomic branches, which people have in mind. For instance, an automatic categorization of "hybrid cars" might results in categories of "gas-electric" "electric-hybrid" "hybrid technology" all referring to aspects of the same mental concept.

Another flaw is that automatically generated categories may be too obscure, when compared to major taxonomic branches that people have in mind. For instance, an automatic categorization of "concept cars" might result in categories of coachbuilder, entertainment value and performance limits.

Yet another flaw is that the categories might match what people have in mind, but the automatically generated labels for those categories differ from what people have in mind. For instance, a person might have in mind a "cars" taxonomy of "sport-utility vehicle," "sports cars," "station wagons" and "sedans." The automatically generated labels for these categories might be "dual-use," "performance," "tailgate" and "saloon."

All of these flaws have severely limited the use of automatic categorizers, and most of these flaws are inherent in the use of statistical methods. It is well known that semantically significant phrases such as "constitutional rights" and "religious beliefs" are conveyed by their own and related statistically insignificant terms, and also that statistically significant terms such as "the" and "a" generally carry semantically trivial meanings. The latter are often added to stopword lists which exclude them from statistical sample sets. However, stopword sets appropriate for categorizing one set of documents may fail utterly for another set. For example, a stopword such as "judge" used for courtroom transcripts may be a semantically important for medical research documents. To gather and detect important semantic meanings conveyed by statistically insignificant terms, researchers have attempted to use pre-defined taxonomies to associate documents to pre-defined important meanings. However, the quickly evolving nature of language has rendered such pre-defined taxonomies to be inappropriate for most uses. For instance, mental cogitations of a person searching for slightly unfamiliar information generally involve terms unrelated to any pre-defined taxonomy. Only by creating a taxonomy on-the-fly of a person's seemingly unrelated search terms can the implicit goal the person has in mind be detected by an automatic categorizer.

Some of the attempts to build on-the-fly automatic categorizers have suggested use of a statistically defined feature list and an anti-feature list so that statistically prevalent labels are created which are statistically unlikely to be shared between categories. Such attempts include U.S. Pat. No. 6,938,025 issued on Aug. 30, 2005, and U.S. Pat. No. 6,826,576 issued on Nov. 30, 2004, both to Lulich et al., each of which is incorporated by reference herein. Although suppression of terms via an anti-feature list can be occasionally useful, overly broad statistical methods of feature extraction disclosed by Lulich inevitably lead to problems with terms improperly added to the anti-feature list, or terms improperly added to the feature-list. It will be obvious to one of ordinary skill in the art that the mental path a person traverses to categorize does not involve reading documents from front to back, while aggregating a massive hierarchy of feature-lists and anti-feature lists. A person would read documents accumulating for semantically significant covering terms, which cover significantly different semantic concepts. This emphasis on semantics means that rather than blindly compiling a single feature-list and anti-feature list for a given node in a pre-existing subject hierarchy, a person would create a more fluid and intelligent optimization around what defines a category in the feature-list and what cannot define a category in an anti-feature-list. This intelligence arises from making use of semantic connections which shift while the text is read and a person learns new semantics from the text. As seen in FIG. 3 of Lulich's patent, formation of a feature-list and anti-feature-list happens on a node-by-node basis for nodes within a subject hierarchy. This formation is created relative to feature-lists connected to sibling nodes of the subject hierarchy. However the content of feature-lists connected to other sibling nodes frequently is arbitrary with respect to any node of the subject hierarchy. As seen in FIG. 10 of Lulich's '576 patent, CHAOS and LOGIC are sibling nodes under MATH. If a person intelligently categorizes LOGIC, GEOMETRY and CALCULUS to be sibling nodes under MATH, the feature-list CHAOS as taught by Lulich will improperly limit and thus mischaracterize the meaning of LOGIC. In general, no pre-existing subject hierarchy can properly drive the entire categorization process. Instead, preexisting hierarchies can at best affect the weight given to specific terms relative to other terms. The formation of a feature-list and anti-feature list has to be initiated without the prejudices incurred by blindly following any pre-existing subject hierarchy. Thus, Lulich's '576 disclosure at best would result in awkward category formations when applied to general purpose text categorization.

A similar awkwardness would result from applying Lulich's earlier U.S. Pat. No. 6,938,025 to general purpose text categorization. By applying document-centered statistical methods to create a content-group and an anti-content group, statistically insignificant but semantically significant terms would fail to join either group, causing the categorization to form around semantically trivial terms. The only statistical remedy to flaws in Lulich's '025 disclosure is application of standard statistical stop word techniques, which as previously discussed cannot work for all sets of documents. In addition, the emphasis on document groups causes problems when a single document such as a literature survey document contains content from multiple categories. To properly categorize cross-over documents, automatic categorization has to coalesce around individual phrases, not individual documents.

In general, previous attempts to automatically categorize data have failed because of over-reliance upon: 1) statistical methods and associated methods of stopword lists and statistical distributions; 2) static taxonomic methods and associated methods of traversing out-of-date taxonomies or 3) methods centered around documents instead of semantics. In order to succeed with general purpose automatic categorization of data, non-statistical, dynamic taxonomic and semantic methods must be employed.

BRIEF SUMMARY OF THE INVENTION

U.S. patent application Ser. No. 10/329,402 discloses a method for automatically generating taxonomies from incoming text streams, without the use of statistics. When applied to text categorization, similar methods dynamically create categorization taxonomies of fine quality. By focusing upon the semantic relationships between each term and each other term throughout the document set of data, no pre-existing hierarchy of subjects can prejudice the formation of categories. Instead, the semantic relationships between terms as expressed by the document set itself become the driving force behind category formation. Any pre-existing hierarchy is used only for mapping sentence structures and synonym sets which provide a raw uncategorized input to an automatic semantic categorizer.

The automatic semantic categorizer itself begins, in one embodiment, with the computation of optimally, or otherwise advantageously, spaced semantic seed terms. As discussed above, automatically generated categories can be too close together, or they can be too obscure. A balance between obscurity and closeness must be struck, similar to the way a person chooses the most pithy salient terms to pigeonhole a category. If a person chooses the most prevalent terms, those terms will frequently be too close together. For example, for categorizing "hybrid car" the terms "gas electric" "electric-hybrid" are very prevalent, but too close together. On the other end of the scale would be a "cars" taxonomy categorized by semantically well spaced but obscure terms, such as: "dual-use," "performance," "tailgate" and "saloon."

In one embodiment, the present invention balances closeness against obscurity to optimally, or otherwise advantageously, compute spaced semantic seed terms. The computation of optimal semantic seed terms is crucial to the optimal automatic formation of categories. The optimal choice of seed terms make the difference, on the one hand, between pithy easily understood categories which can be used in natural language conversation and, on the other hand, sloppy verbose categories which resemble gibberish.

The present invention chooses seed terms by relating every term to every other term within a document set. For a large document set, such as the worldwide web, this comparison is computationally expensive and approximations can be used, such as limiting the number of categories desired, or limiting categorization to a representative document set. Fortunately, both approximations work well in actual practice. For output to a conversational or chat-based search engine portal or chatterbot, the number of categories desired is a small number, usually less then seven and often as low as four. Any higher, and the categories become difficult to chat about, because the effort to enumerate all would be too great. In additional, any cognitive user-interface optimization of seven-plus-or-minus-two user interface elements presented at a time limits the desired number of categories to seven.

Selection of a representative document set also works well. Most of the world wide web is searched via keyword based portal returning results sets an insignificant fraction of the total web in size. By taking search query input from a user, a keyword lookup of results for that query can greatly reduce the representative document size. Or, for large query results, only using the summary blurb of three sentences per web site instead of web documents themselves could be an even greater reduction of representative document size. Of course, it would be more accurate to use a semantic parse of the document data itself, but until a semantic web index of the entire web is created, a keyword index can suffice to produce a representative document set.

Another approximation that works well is the segmentation of documents into smaller semantic groups. Sentences, and even subject, verb and object clauses, can be computed to properly to detect whether two terms co-occur within the same semantic group. For instance, when comparing the terms "hybrid" and "car," it is much more significant that "hybrid" and "car" occur within the same sentence than in disjoint sentences of the same document. It is also more significant that they occur adjacent to each other, in the same clause, rather than in separate clauses. By tightly bounding locations where terms can be considered to co-occur, the number of co-occurrences that need to be tracked can thereby be reduced.

In one embodiment, the present invention computes an optimally spaced semantic seed list one seed at a time. This careful seed-at-a-time approach yields the highest quality seeds. Since most commercial applications of automatic clustering only need a handful of seeds, this approach makes good economic sense. The semantic seed list starts empty. To promote relevancy, the first candidate seed may be chosen form the list of most prevalent terms. The second candidate seed may also be chosen from the list of most prevalent terms. This first candidate pair then drives the computation of the first candidate descriptor list, which are terms co-occurring with one but not both of the terms of the candidate pair. The first candidate pair also drives the computation of the first candidate deprecated terms, which are terms co-occurring with both terms of the candidate pair. The size of the deprecated list measures the closeness of the candidate pair. The size of the descriptor list measures the prevalence of the candidate pair. The balanced desirability of the candidate pair is the size of the descriptor list divided by the size of the deprecated list.

To compute the best candidate pair, all possible combinations of terms must be computed, ranking them by balanced desirability. For a large set of n terms, the n times (n minus 1) balanced desirability numbers must be computed and ranked. For a small document set of a hundred sentences, typically the number of terms is about 1000. Consequently, 1000 times 999 balanced desirability numbers must be computed, which on a modern desktop computer can be done in a split second. This computation produces the first and second optimal seed terms.

To compute more seed terms, much more computation is required. For instance, to compute the best candidate triplet, all possible combinations of three seeds must be compared. For the same small document of a hundred sentences and 1000 terms, this could be 1000 times 999 times 998 computations, which would take a while even on a fast computer. Computing the best candidate quadruplet would take 997 times as long. Clearly, this computation could be sped up by parallel processing.

However, there are approximations to the computation, which take advantage of the fact that the best candidate pair is frequently established as a basis for accumulating third and fourth seeds.

To approximate a computation of the third seed term, candidate third seed terms may be paired on a trial basis both with the first and second seed terms, and with the overall ranking of third seed terms based on an average of desirability numbers from first and second seed term pairings. As each additional seed term is computed, the overall rankings must be computed from averaged desirability number from pairing every candidate term with each optimal seed term already collected.

Subsequent candidate terms skipping over terms already collected as optimal seed terms, but even this approximation's computational burden rises rapidly as the collected number of optimal seed terms rises. Obviously, this approximation computation is also a good candidate for parallel processing for a large number of seeds, but even on a single processor the computation can be done quickly to get four optimally spaced seed terms.

Variations on the computation are suited for various application needs. For instance, often a user has submitted a specific query term. That query term may have been used to compute a keyword-based or semantically-based result document set. Of course, the query term itself appears within those within the document set, but a user generally expects to categories formed around seed terms other than the query term itself. Therefore, the query term itself is blocked from the sets of candidate terms.

A user may have indicated, either through chat hints, voice conversation, or by clicking on buttons or other input, that a set of specific terms is unacceptable for categorization. These specific terms can be blocked from the sets of candidate terms, thus allowing other candidate terms to surface as optimal semantic seed terms for a better fit to the user's directives.

A user may also have indicated, either through chat hints, voice conversation, or by clicking on buttons or other input, that a set of specific terms is most desirable for categorization. These specific terms can be given a higher weight, either directly increasing their balanced desirability numbers, or by removing documents from the representative document set which do not semantically relate to the specific terms, and then reparsing the smaller representative document set and recomputing the optimal semantic seeds while blocking the actual specific terms from the sets of candidate terms. The present invention takes each complete set of optimal semantic seeds as a starting point for collecting lists of related terms and semantic scopes for each seed. The related terms are computed from the most prevalent terms in the descriptor list for the seed, and the usage characteristics are computed from semantic scopes associated with the seed, at whatever level various applications may need, such as web-site or document level, paragraph level or even sentence level. Together the related terms and usage characteristics provide useful output to a variety of applications, such as search engine portal, search enable chatterbot, dictionary or encyclopedia browser. The present invention discloses even further uses for succinct categorization, such as automatic augmentation of semantic network dictionaries using the optimal semantic seeds to define dictionary entries. For instance, prevalent terms found on the web using either a keyword or semantic index to web sites can be automatically analyzed using the automatic categorizer of the present invention, in accordance with one embodiment. A small number of optimal semantic seeds associated with each prevalent term can generate a polysemous set of meanings for that term, one polysemous meaning per optimal semantic seed. From there, the automatic categorizer can be used to categorize the meaning each optimal semantic seed, producing a set of terms to be inherited by the corresponding polysemous meaning. By automatically linking nodes representing each optimal semantic seed to nodes representing categories of meaning for that seed, the full semantic meaning of that seed can be automatically stored in a semantic network dictionary. The full set of optimal semantic seeds for a prevalent term can be automatically added as well, thus automatically completing the meaning of that prevalent term according to current usage across the world-wide web. This method of automatic dictionary construction is the only way lexicography can ever keep up with the explosive growth in semantic meanings generated by the growth of the world wide web. And, in turn, this automatically augmented dictionary can be used to provide more accurate parsing of text into smaller semantic groups, for more accurate subsequent automatic categorization.

DETAILED DESCRIPTION OF THE INVENTION

Figure 1:
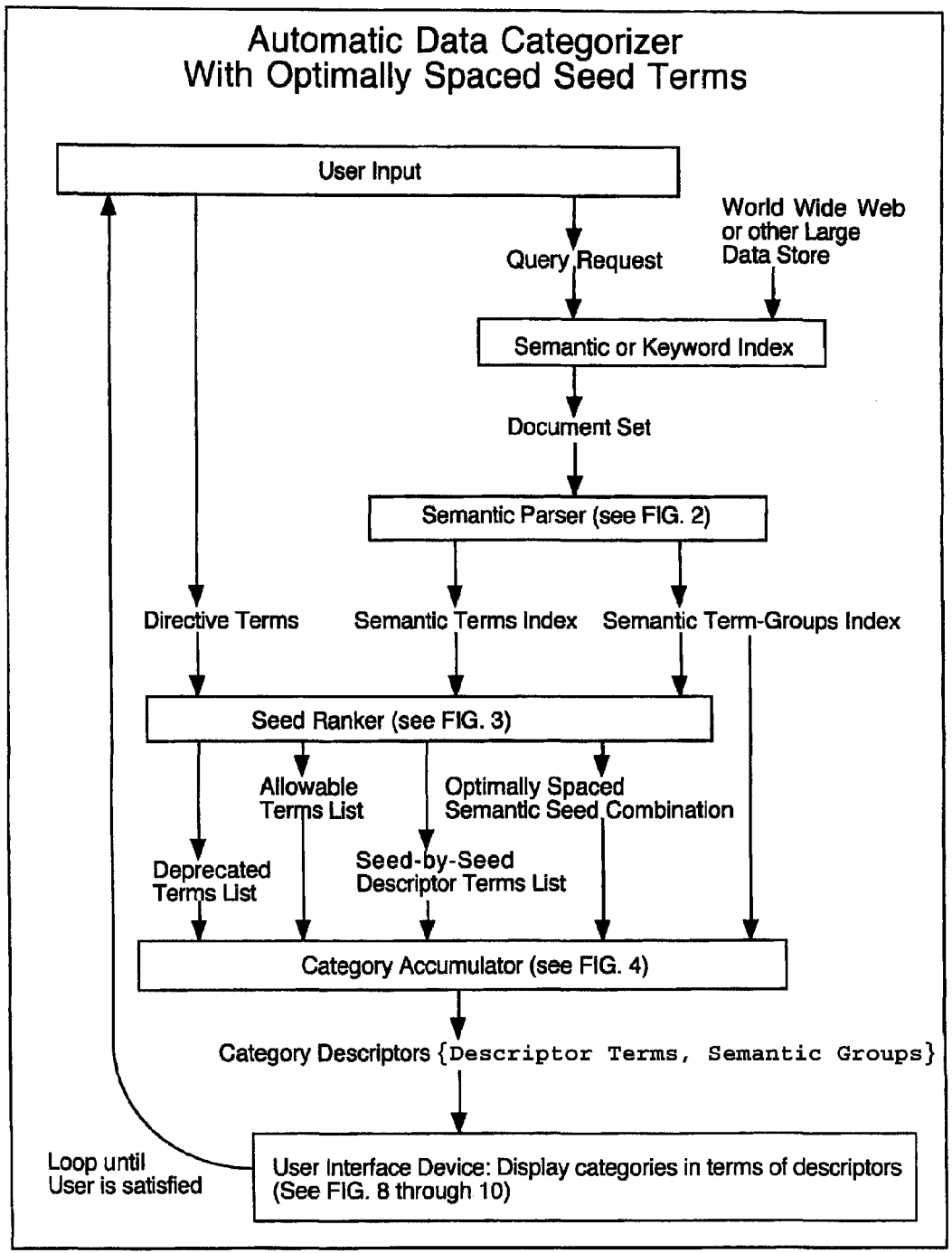
FIG. 1 shows a flowchart overview of a method for automatically categorizing data, in accordance with one embodiment of the present invention.

FIG. 1 shows a method for automatically categorizing data pertaining to a Query Request, in accordance with one embodiment of the present invention. Typically the Query Request originates from a person, such as a User of an application. For instance, a user of a search portal into the World Wide Web might submit a Search Term which would be used as a Query Request. Alternatively, a user of a large medical database could name a Medical Procedure whose meaning would be used as a Query Request. Then the Query Request serves as input to a Semantic or Keyword Index which in turn retrieves a Document Set corresponding to the Query Request. If a Semantic Index is used, semantic meanings of the Query Request will select documents from the World Wide Web or other Large Data Store which have semantically related phrases. If a Keyword Index is used, the literal words of the Query Request will select documents from the World Wide Web or other Large Data Store which have the same literal words. A Semantic Index, such as the one disclosed in U.S. patent application Ser. No. 10/329,402 is far more accurate than a Keyword Index. At the same time, maintaining a Semantic Index will generally consume more computer resources than a Keyword Index. The output of the Semantic or Keyword Index is a Document Set, which may be a list of pointers to documents, such as URLs, or the documents themselves, or smaller specific portions of documents such as paragraphs, sentences or phrases, all tagged by pointers to documents.

The Document Set is then input to the Semantic Parser, which segments data in the Document Set into meaningful semantic units, if the Semantic Index which produces the Document Set has not already done so. Meaningful semantic units include sentences, subject phrases, verb phrases and object phrases.

Figure 2:
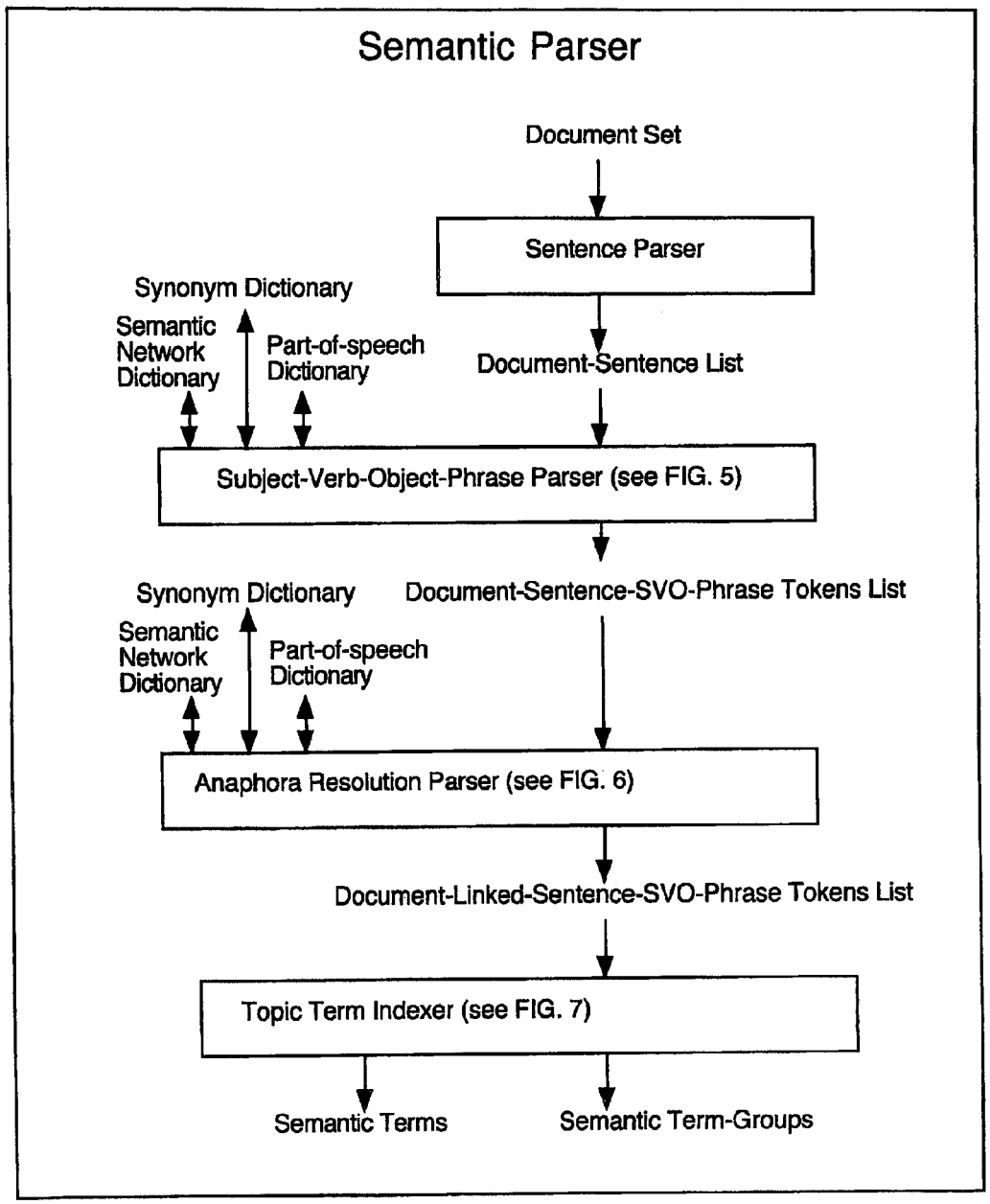
FIG. 2 shows a detailed flowchart of a method of parsing documents into semantic terms and semantic groups, in accordance with one embodiment of the present invention.

As shown in FIG. 2, by first passing the Document Set through a Sentence Parser, the Document Set can first be digested into individual sentences, by looking for end-of-sentence punctuations such as "?", ".", "!" and double line-feeds. The Sentence Parser outputs individual sentences tagged by pointers to documents, producing the Document-Sentence list.

Figure 5:
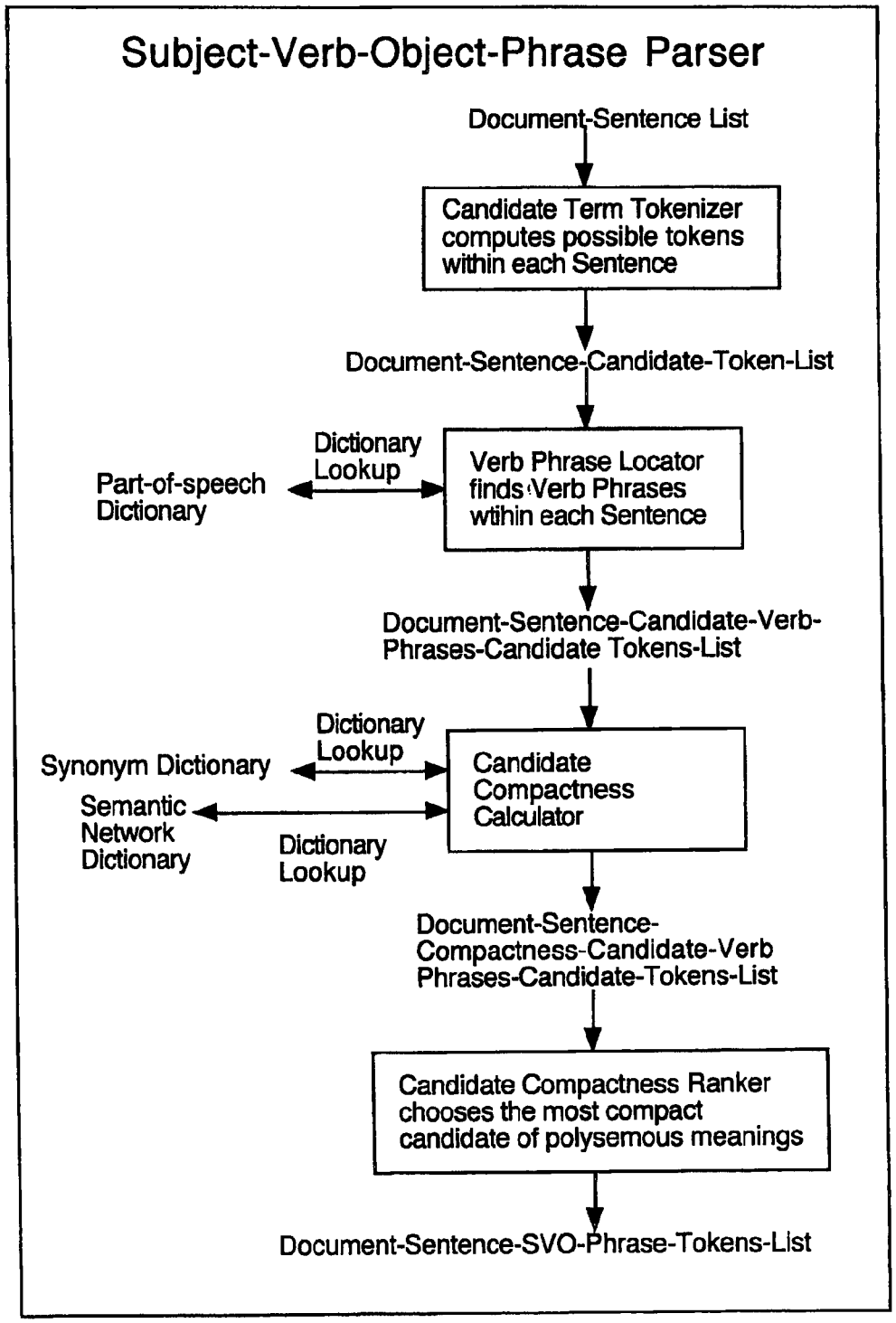
FIG. 5 shows a detailed flowchart of a method for parsing sentences into subject, verb and object phrases, in accordance with one embodiment of the present invention.

As shown in FIG. 5, a Semantic Network Dictionary, Synonym Dictionary and Part-of-Speech Dictionary can then be used to parse sentences into smaller semantic units. For each individual sentence, the Candidate Term Tokenizer computes possible tokens within each Sentence by looking for possible one, two and three word tokens. For instance, the sentence "time flies like an arrow" could be converted to Candidate Tokens of "time," "flies," "like," "an," "arrow," "time flies," "flies like," "like an," "an arrow," "time flies like," "flies like an," "like an arrow." The Candidate Term Tokenizer produces a Document-Sentence-Candidate-Token-List containing Candidate Tokens tagged by their originating sentences and originating Documents. Sentence by sentence, the Verb Phrase Locator then looks up Candidate Tokens in the Part-of-speech dictionary to find possible Candidate Verb Phrases. The Verb Phrase Locator produces a Document-Sentence-Candidate-Verb-Phrases-Candidate Tokens-List which contains Candidate Verb Phrases tagged by their originating sentences and originating Documents. This list is surveyed by the Candidate Compactness Calculator, which looks up Candidate Tokens in a Synonym Dictionary and Semantic Network Dictionary to compute the compactness of each Candidate Verb Phrases competing for each sentence. The compactness of each Candidate may be a combination of semantic distance from a Verb Phrase Candidate to other phrases in the same sentence, or the co-location distance of tokens of the Verb Phrase to each other, or the co-location or semantic distance to proxy synonyms in the same sentence. The Candidate Compactness Calculator produces the Document-Sentence-Compactness-Candidate-Verb Phrases-Candidate-Tokens-List in which each Candidate Verb Phrase has been tagged by a Compactness number and tagged by their originating sentences and originating Documents.

The Document-Sentence-Compactness-Candidate-Verb Phrases-Candidate-Tokens-List is then winnowed out by the Candidate Compactness Ranker which chooses the most semantically compact competing Candidate Verb Phrase for each sentence. The Candidate Compactness Ranker then produces the Subject and Object phrases from nouns and adjectives preceding and following the Verb Phrase for each sentence, thus producing the Document-Sentence-SVO-Phrase-Tokens-List of Phrase Tokens tagged by their originating sentences and originating Documents.

Figure 6:
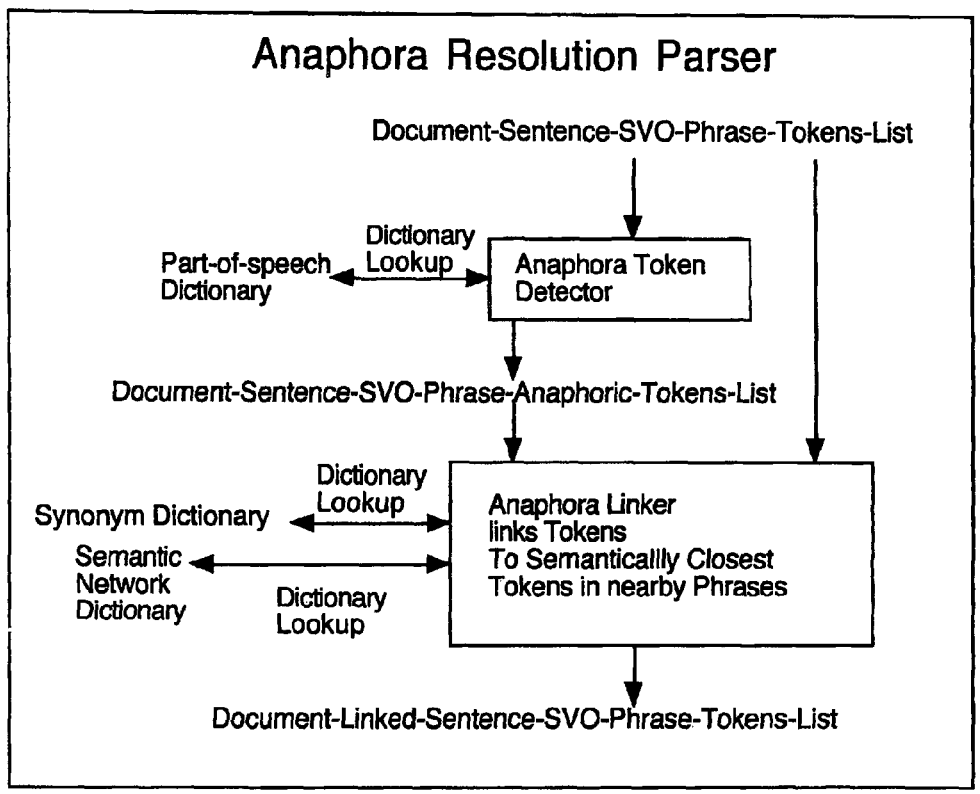
FIG. 6 shows a detailed flowchart of a method for resolving anaphora imbedded in subject, verb and object phrases, in accordance with one embodiment of the present invention.
Figure 7:
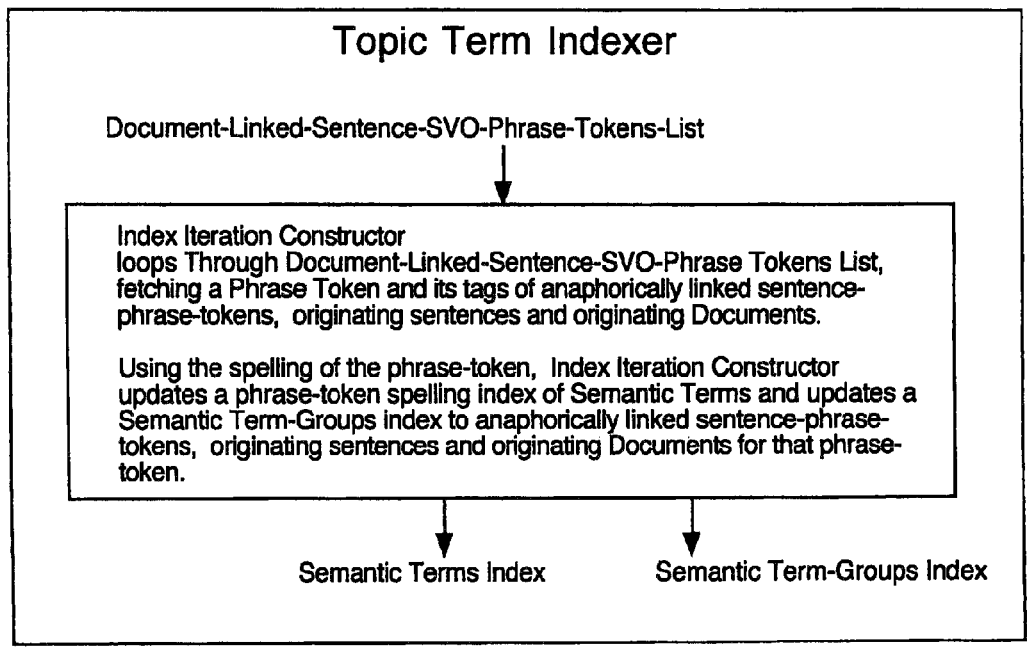
FIG. 7 shows a detailed flowchart of a method for analyzing semantic terms imbedded in a phrase tokens list, outputting an index of semantic terms and an index of locations where semantic terms are co-located, in accordance with one embodiment of the present invention.

In FIG. 2, the Document-Sentence-SVO-Phrase-Tokens-List is input to the Anaphora Resolution Parser. Since the primary meaning of one sentence often connects to a subsequent sentence through anaphora, it is very important to link anaphora before categorizing clusters of meaning. For instance "Abraham Lincoln was President during the Civil War. He wrote the Emancipation Proclamation" is implies "Abraham Lincoln wrote the Emancipation Proclamation." Linking the anaphoric word "He" to "Abraham Lincoln" resolves that implication. In FIG. 6, the Anaphora Token Detector uses a Part-of-speech Dictionary to lookup anaphoric tokens such he, she, it, them, we, they. The Anaphora Token Detector produces the Document-Sentence-SVO-Phrase-Anaphoric-Tokens-List of Anaphoric Tokens tagged by originating Documents, sentences, subject, verb or object phrases. The Anaphora Linker then links these unresolved anaphora to nearest subject, verb or object phrases. The linking of unresolved anaphora can be computed by a combination of semantic distance from an Anaphoric Token to other phrases in the same sentence, or the co-location distance of an Anaphoric Token to other phrases in the same sentence, or the co-location or semantic distance to phrases in preceding or following sentences.

The Anaphora Linker produces the Document-Linked-Sentence-SVO Phrase-Tokens-List of Phrase Tokens tagged by their anaphorically linked sentence-phrase-tokens, originating sentences and originating Documents. On FIG. 2, the Document-Linked-Sentence-SVO-Phrase-Tokens-List is input to the Topic Term Indexer. The Topic Term Indexer loops through each Phrase Token in the Document-Linked- Sentence-SVO-Phrase-Tokens-List, recording the spelling of the Phrase Token in Semantic Terms Index. The Topic Term Indexer also records the spelling of the Phrase Token as pointing to anaphorically linked sentence-phrase-tokens, originating sentences and originating Documents in the Semantic Term-Groups Index. The Semantic Term-Groups Index and Semantic Terms Index are both passed as output from the Topic Term Indexer. To conserve memory, the Semantic Term-Groups Index can serve in place of Semantic Terms Index, so that only one index if passed as output of the Topic Term Indexer.

In FIG. 1, the Semantic Terms Index, the Semantic Term-Groups Index and any Directive Terms from the user are passed as input to the Seed Ranker. Directive Terms include any terms from User Input or an automatic process calling the Automatic Data Categorizer which have special meaning to the Seed Ranking process. Special meanings include terms to be precluding from Seed Ranking or terms which must be included as Semantic Seeds the Seed Ranking process. For instance, a user may have indicated that "rental" be excluded from and "hybrid" be included in Semantic Seed Terms around which categories are to be formed.

Figure 3:
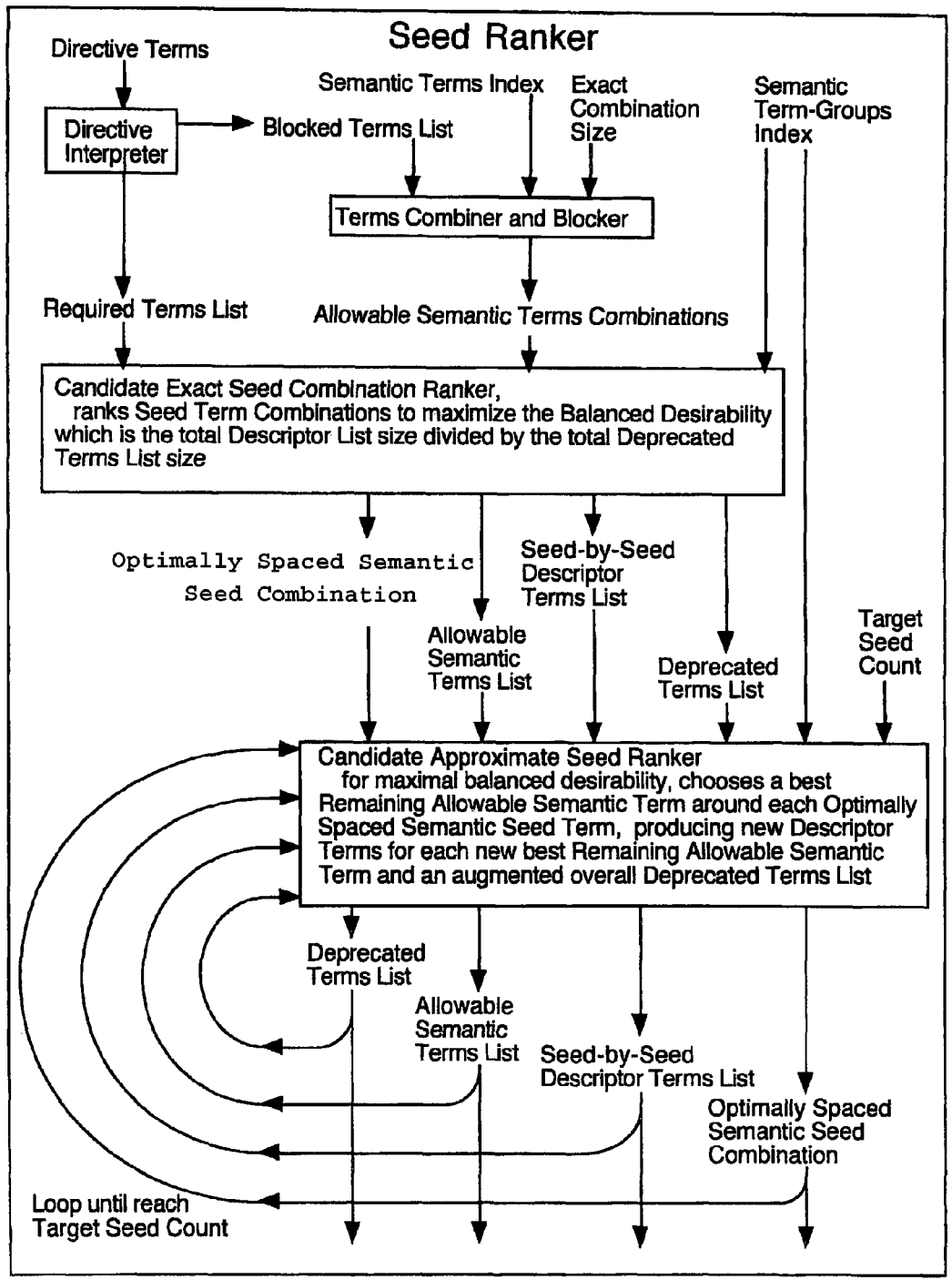
FIG. 3 shows a detailed flowchart of a method for ranking semantic terms for finding an optimal, or otherwise advantageous, set of semantic seeds, in accordance with one embodiment.

In FIG. 3, the Seed Ranker flowchart shows how inputs of Directive Terms, Semantic Terms Index and Semantic Term-Groups Index are computed to produce Optimally Spaced Seed Terms. The Directive Interpreter takes input Directive Terms such as "Not rental but hybrid" and parses the markers of "Not" and "but" to produce a Blocked Terms List of "rental" and a Required Terms List of "hybrid." This parsing can be done on a keyword basis, synonym basis or by semantic distance methods as in U.S. patent application Ser. No. 10/329,402. If done on a keyword basis the parsing will be very quick, but not as accurate as on a synonym basis. If done on a synonym basis, the parsing will be quicker but not as accurate as parsing done on a semantic distance basis.

The Blocked Terms List, Semantic Terms Index and Exact Combination Size are inputs to Terms Combiner and Blocker. The Exact Combination Size controls the number of seed terms in a candidate combination. For instance, if a Semantic Terms Index contained N terms, the number of possible two-term combinations would be N times N minus one. The number of possible three-term combinations would be N times (N minus one) times (N minus two). Consequently a single processor implementation of the present invention would limit Exact Combination Size to a small number like 2 or 3. A parallel processing implementation or very fast uni-processor could compute all combinations for a higher Exact Combination Size.

The Terms Combiner and Blocker prevents any Blocked Terms in the Blocked Terms list from inclusion in Allowable Semantic Terms Combinations. The Terms Combiner and Blocker also prevents any Blocked Terms from participating with other terms in combinations of Allowable Semantic Terms Combinations. The Terms Combiner and Blocker produces the Allowable Semantic Terms Combinations as output.

Together the Allowable Semantic Terms Combinations, Required Terms List and Semantic Term-Groups Index are input to the Candidate Exact Seed Combination Ranker. Here each Allowable Semantic Term Combination is analyzed to compute the Balanced Desirability of that Combination of terms. The Balanced Desirability takes into account the overall prevalence of the Combination's terms, which is a desirable, against the overall closeness of the Combination's terms, which is undesirable.

The overall prevalence is usually computed by counting the number of distinct terms, called peer-terms, co-located with the Combination's terms within phrases of the Semantic Term-Groups Index. A slightly more accurate measure of overall prevalence would also include the number of other distinct terms co-located with the distinct peer-terms of the prevalence number. However this improvement tends to be computationally expensive, as are similar improvements of the same kind, such as semantically mapping synonyms and including them in the peer-terms. Other computationally fast measures of overall prevalence can be used, such as the overall number of times the Combination's terms occur within the Document Set, but these other measures tend to be less semantically accurate.

The overall closeness of the Combination's terms is usually computed by counting the number of distinct terms, called Deprecated Terms, within are terms co-located with two or more of the Combination's Seed Terms. These Deprecated Terms are indications that the Seed Terms actually collide in meaning Deprecated Terms cannot be used to compute a Combination's Prevalence, and are excluded from the set of peer-terms in the above computation of overall prevalence for the Combination.

The Balanced Desirability of a Combination of terms is its overall prevalence divided by its overall closeness. If needed, this formula can be adjusted to favor either prevalence or closeness in some non-linear way. For instance, a Document Set like a database table may have an unusually small number of distinct terms in each sentence, so that small values prevalence need a boost to balance with closeness. In such cases, the formula might be overall prevalence times overall prevalence divided by overall closeness. For an example of computing the Balanced Desirability of Seed Terms, Semantic Terms of gas/hybrid and "hybrid electric" are frequently co-located within sentences of documents produces by a keyword or semantic index on "hybrid car." Therefore, an Exact Combination Size of 2 could produce an Allowable Semantic Term Combination of gas/hybrid and "hybrid electric" but the Candidate Exact Seed Combination Ranker would reject it in favor of an Allowable Semantic Term Combination of slightly less overall prevalence but much less collision between its component terms, such as "hybrid technologies" and "mainstream hybrid cars." The co-located terms shared between seed Semantic Terms are output as Deprecated Terms List. The co-located terms which are not Deprecated Terms but are co-located with individual seed Semantic Terms are output as Seed-by-Seed Descriptor Terms List. The seed Semantic Terms in the best ranked Allowable Semantic Term Combination are output as Optimally Spaced Semantic Seed Combination. All other Semantic Terms from input Allowable Semantic Terms Combinations are output as Allowable Semantic Terms List.

In variations of the present invention where enough compute resources are available to compute with Exact Combination Size equal to the desired number of Optimally Spaced Seed Terms, the above outputs are final output from the Seed Ranker, skipping all computation in the Candidate Approximate Seed Ranker in FIG. 3 and just passing the Deprecated Terms List, Allowable Semantic Terms List, Seed-by-Seed Descriptor Terms List and Optimally Spaced Semantic Seed Combination as output directly from Candidate Exact Seed Combination Ranker.

However, most implementations of the present invention do not have enough compute resources to compute the Candidate Exact Seed Combination Ranker with Exact Combination Size greater than two or three. Consequently, a Candidate Approximate Seed Ranker is needed to produce a larger Seed Combination of four or five or more Seed Terms. Taking advantage of the tendency of optimal set of two or three Seed Terms to define good anchor points for seeking additional Seeds, to acquire a few more nearly optimal seeds, as shown in FIG. 3, a Candidate Approximate Seed Ranker takes input of Optimally Spaced Semantic Seed Combination, Allowable Semantic Terms, Seed-by-Seed Descriptor Terms and Deprecated Terms.

The Candidate Approximate Seed Ranker checks the Allowable Semantic Terms List term by term, seeking the candidate term whose addition to the Optimally Spaced Semantic Seed Combination would have the greatest Balanced Desirability in terms of a new overall prevalence which includes additional peer-terms corresponding to new distinct terms co-located the candidate term, and a new overall closeness, which includes co-location term collisions between the existing Optimally Spaced Semantic Seed Combination and the candidate term. After choosing a best new candidate term and adding it to the Optimally Spaced Semantic Seed Combination, the Candidate Approximate Seed Ranker stores a new augmented Seed-by-Seed Descriptor Terms List with the peer-terms of the best candidate term, a new augmented Deprecated Terms List with the term collisions between the existing Optimally Spaced Semantic Seed Combination and the best candidate term, and a new smaller Allowable Semantic Terms List missing any terms of the new Deprecated Terms List or Seed-by-Seed Descriptor Terms Lists.

In one embodiment, the present invention loops through the Candidate Approximate Seed Ranker accumulating Seed Terms until the Target Seed Count is reached. When the Target Seed Count is reached, the then current Deprecated Terms List, Allowable Semantic Terms List, Seed-by-Seed Descriptor Terms List and Optimally Spaced Semantic Seed Combination become final output of the Seed Ranker of FIG. 3.

FIG. 1 shows that outputs of the FIG. 3 Seed Ranker, together with the Semantic Term-Groups Index, are passed as input to the Category Accumulator.

Figure 4:
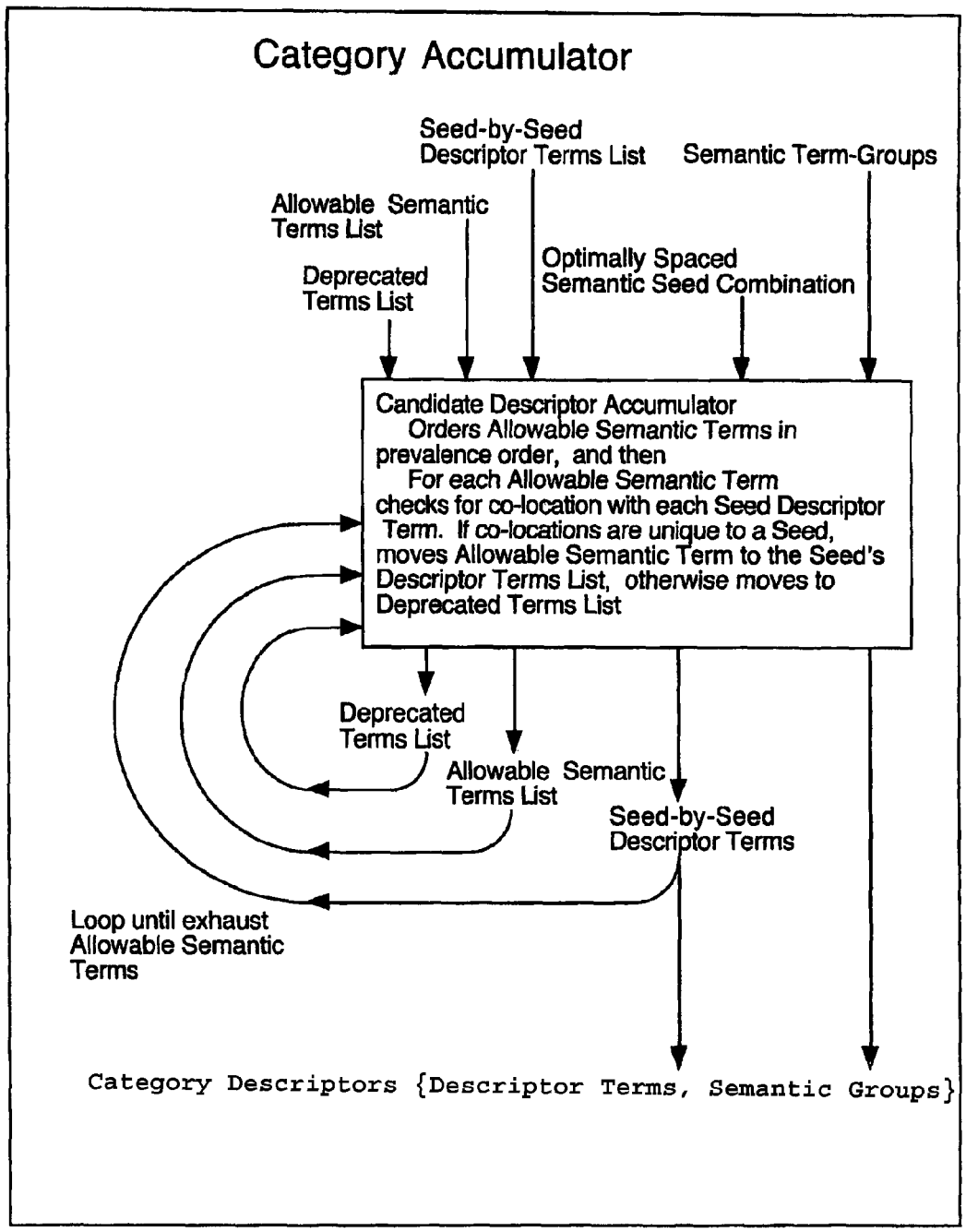
FIG. 4 shows a detailed flowchart of a method for accumulating semantic terms around a core optimal set of semantic seeds, in accordance with one embodiment of the present invention.

FIG. 4 shows a detailed flowchart of computation typical of the Category Accumulator, in accordance with one embodiment. The purpose of the Category Accumulator is to deepen the list of Descriptor Terms which exists for each Seed of the Optimally Spaced Semantic Seed Combination. Although Seed-by-Seed Descriptor Terms are output in lists for each Seed of the Optimally Spaced Semantic Seed Combination by the Seed Ranker of FIG. 3, the Allowable Semantic Terms List generally contains semantic terms which are pertinent to specific Seeds.

To add these pertinent semantic terms to the Seed-by-Seed Descriptor Terms List of the appropriate Seed, the FIG. 4 Category Accumulator orders Allowable Semantic Terms in term prevalence order, where term prevalence is usually computed by counting the number of distinct terms, called peer-terms, co-located with the Allowable Term within phrases of the Semantic Term-Groups Index. A slightly more accurate measure of term prevalence would also include the number of other distinct terms co-located with the distinct peer-terms of the prevalence number. However this improvement tends to be computationally expensive, as are similar improvements of the same kind, such as semantically mapping synonyms and including them in the peer-terms. Other computationally fast measures of term's prevalence can be used, such as the overall number of times the Allowable Term occurs within the Document Set, but these other measures tend to be less semantically accurate.

The Category Accumulator then traverses the ordered list of Allowable Semantic Terms, to work with one candidate Allowable Term at a time. If the candidate Allowable Term co-locates within phrases of the Semantic Term-Groups with Seed Descriptor Terms of only one Seed, then the candidate Allowable Term is moved to that Seed's Seed-by-Seed Descriptor Terms List. However if the candidate Allowable Term co-locates within phrases of the Semantic Term-Groups with a Seed-by-Seed Descriptor Terms List of more than one Seed, the candidate Allowable Term is moved to the Deprecated Terms List. If the candidate Allowable Term co-locates within phrases of the Semantic Term-Groups with Seed Descriptor Terms of no Seed, the candidate Allowable Term is an orphan term and is simply deleted from the Allowable Terms List. The Category Accumulator continues to loop through the ordered Allowable Semantic Terms, deleting them or moving them to either the Deprecated Terms List or one of the Seed-by-Seed Descriptor Terms Lists until all Allowable Semantic Terms are exhausted and the Allowable Semantic Terms List is empty. Any Semantic Term-Groups which did not contribute Seed-by-Seed Descriptor Terms can be categorized as belonging to a separate "other . . . " category with its own Other Descriptor Terms consisting of Allowable Semantic Terms which were deleted from the Allowable Semantic Terms List. As final FIG. 4 output, the Category Accumulator packages each Seed Term of the Optimally Spaced Semantic Seed Combination with a corresponding Seed-by-Seed Descriptor Terms List and with a corresponding list of usage locations from the Document Set's Semantic Term-Groups Index such as documents, sentences, subject, verb or object phrases. This output package is collectively called the Category Descriptors which are the output of the Category Accumulator.

Figure 8:
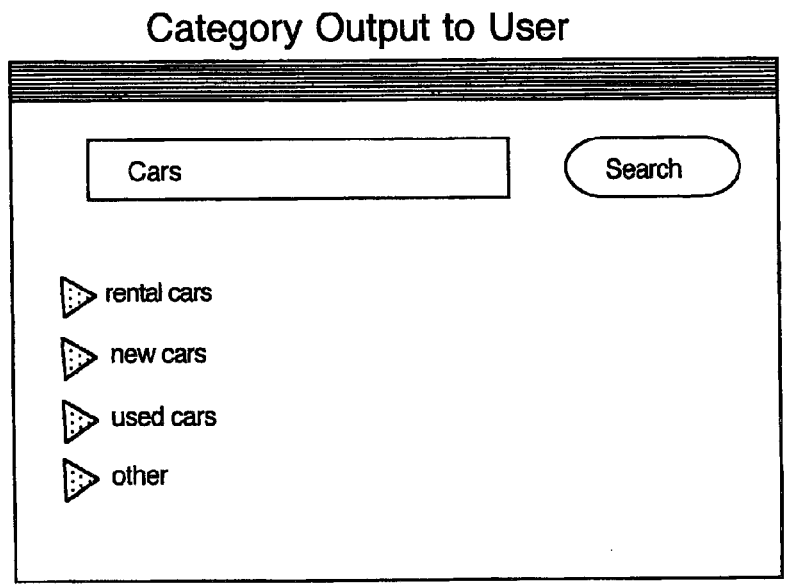
FIG. 8 shows a web portal web search user interface using an automatic categorization of web pages to summarize search results into a four categories, in accordance with one embodiment of the present invention.

Some variations of the present inventions will keep the Seed-by-Seed Descriptor Terms List in the accumulated order. Others will sort the Seed-by-Seed Descriptor Terms List by prevalence order, as defined above, or by semantic distance to Directive Terms or even alphabetically, as desired by users of an application calling the Automatic Categorizer for user interface needs. In FIG. 1 the Category Descriptors are input to the User Interface Device. The User Interface Device displays or verbally conveys the Category Descriptors as meaningful categories to a person using an applications such as a web search application, chat web search application or cellphone chat web search application. FIG. 8 shows an example of a web search application with a box for User Input at top left, a Search button to initiate processing of User Input at top right, and results from processing User Input below them. The box for User Input shows "Cars" as User Input. The Search Results from "Cars" is shown as three categories displayed as their seed terms of "rental cars," "new cars," "user cars." Documents and their Semantic Term-Groups which did not contribute to these three seed term Seed-by-Seed Descriptor Terms Lists are summarized under the "other . . . " category.

Figure 9:
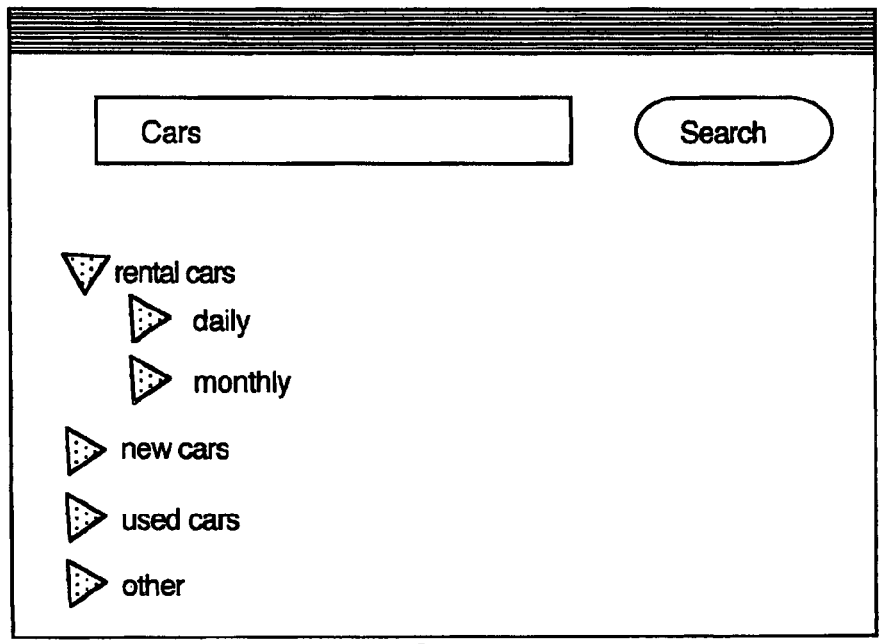
FIG. 9 shows search results of FIG. 8 with the category of "rental cars" clicked open to reveal subcategories of rental cars, in accordance with one embodiment of the present invention.

FIG. 9 shows the User Interface Device of FIG. 8 with the triangle icon of "rental cars" clicked open to reveal subcategories of "daily" and "monthly," in accordance with one embodiment.

Similar displayed subcategories may be selected either from highly prevalent terms in the category's Seed-by-Seed Descriptor Terms List, or by entirely rerunning the Automatic Data Categorizer upon a subset of the Document Set pointed to by the Category Descriptors for the "rental cars" category.

Figure 10:
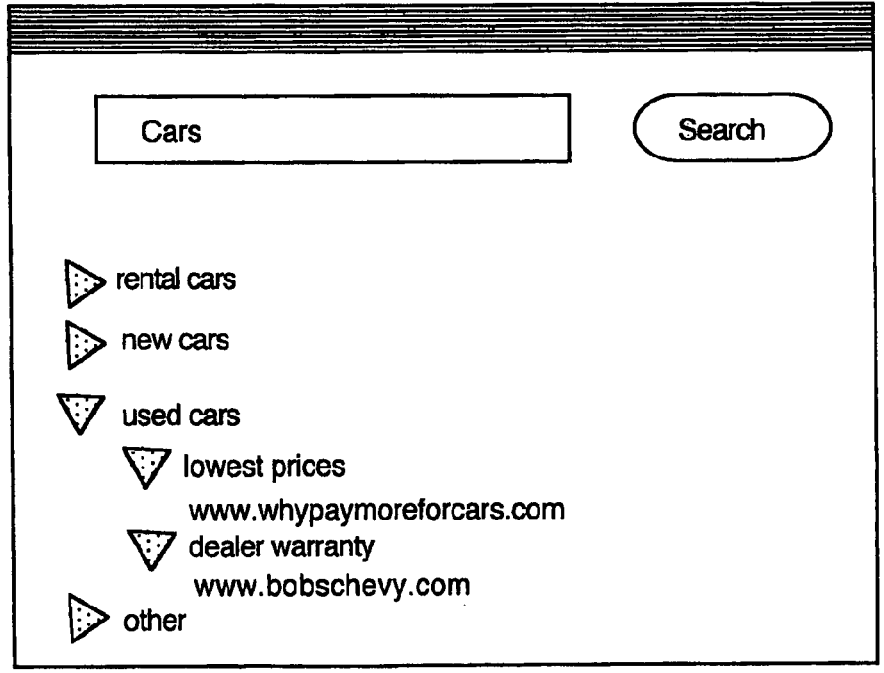
FIG. 10 shows search results of FIG. 8 with the category of "used cars" clicked open to reveal URLS of web pages in that category, in accordance with one embodiment of the present invention.

FIG. 10 shows the User Interface Device of FIG. 8 with the triangle icon of "used cars" clicked open to show individual web site URLs and best URL Descriptors for those web site URLs, in accordance with one embodiment. When a category such as "used cars" has only a few web sites pointed to by the Category Descriptors for the "used cars" category, users will generally want to see them all at once, or in the case of a telephone User Interface Device, users will want to hear about them all at once, as read aloud by a voiced synthesizer. Best URL Descriptors can be chosen from the most prevalent terms pointed to by the Category Descriptors for the "used cars" category. In cases where two or more prevalent terms are nearly tied for most prevalent, they can be concatenated together, to display or read aloud by a voice synthesizer as a compound term such as "dealer warranty."

Figure 11:
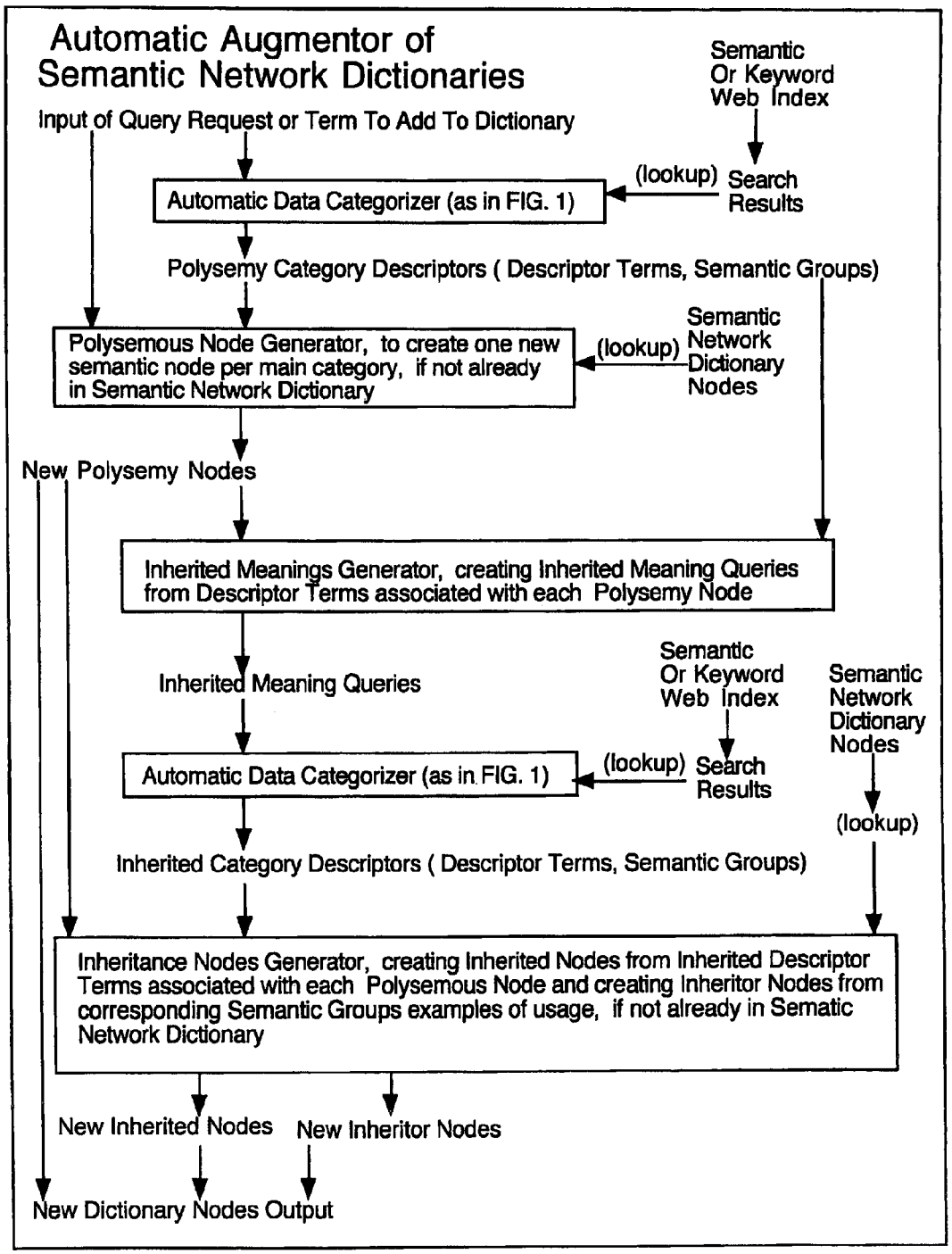
FIG. 11 shows a method of using the automatic categorizer of FIG. 1 for automatically augmenting a semantic network dictionary vocabulary, in accordance with one embodiment of the present invention.

FIG. 11 shows a high level flowchart of a method to automatically augment a semantic network dictionary, in accordance with one embodiment. One of the significant drawbacks of traditional semantic network dictionaries is the typically insufficient semantic coverage enabled by hand-built dictionaries. U.S. patent application Ser. No. 10/329,402 discloses automatic methods to augment semantic network conversations through conversations with application users. However, the quality of those applications depends greatly upon the pre-existing semantic coverage of the semantic network dictionary.

Rather than subject users to grueling bootstrapping phase during which the user must tediously converse about building block fundamental semantic terms, essentially defining a glossary through conversation, an end-user application can acquire vocabulary just-in-time to converse about it intelligently. By taking a user's conversational input, and treating it as a query request to a Semantic or Keyword Index, the Document Set which results from that query run through the Automatic Data Categorizer of FIG. 1. The Category Descriptors from that run can be used to direct the automatic construction of semantically accurate vocabulary related to the user's conversational input, all before responding to the user conversationally. Thus the response to the user utilize vocabulary which did not exist in the semantic network dictionary before the user's conversational input was received. Thus vocabulary generated just-intime for an intelligent response can take the place of tedious conversation about building block fundamental semantic terms. For instance, if the user's conversational input mentioned hybrid cars, and the semantic network dictionary did not have vocabulary for the terms gas-electric or "hybrid electric," these terms could be quickly automatically added to the semantic network dictionary before continuing to converse with the user about "hybrid cars."

FIG. 11 takes an input of a Query Request or a Term to add to a dictionary such as "hybrid cars" and sends through the method of FIG. 1, which returns corresponding Category Descriptors. Each seed term of the Category descriptors can be used to define a polysemous meaning for "hybrid cars." For instance, even if the seed terms are not exactly what a lexicographer would define as meanings, such as "Toyota Hybrid," "Honda Hybrid" and "Fuel Cell Hybrid" each seed term can generate a semantic network node of the same spelling, to be inherited by individual separate polysemous nodes of "hybrid cars." The Polysemous Node Generator of RG. 1 creates these, nodes. Then, the meaning of each individual separate polysemous nodes of "hybrid cars" can be further defined, as a lexicographer would appreciate, by re-querying the Semantic or Keyword Index with each Descriptor Term that was just linked as an inherited term of an individual separate polysemous nodes of "hybrid cars." So for instance "Toyota Hybrid" would be used as input to the method of FIG. 1, to produced Category Descriptor Seed Terms describing "Toyota Hybrid," such as "Hybrid System," "Hybrid Lexus" and "Toyota Prius." The Inheritance Nodes Generator of FIG. 11 created nodes of these spellings, if not already in the Semantic Network Dictionary, and links them to make them inherited by the corresponding individual separate polysemous node such as "hybrid cars" created to describe "Toyota Hybrid."

The advantage of automatically generating semantic network vocabulary is low labor cost and up-to-date meanings for nodes. The disadvantage is that a very large number of nodes are created, even after checking to make sure that no node of the same spelling or same spelling related through morphology already exists (such as cars related to car). However methods disclosed by U.S. patent application Ser. No. 10/329,402 may be used to later simplify the semantic network by substituting one node for another node when both nodes having essentially the same semantic meaning.

Figure 12:
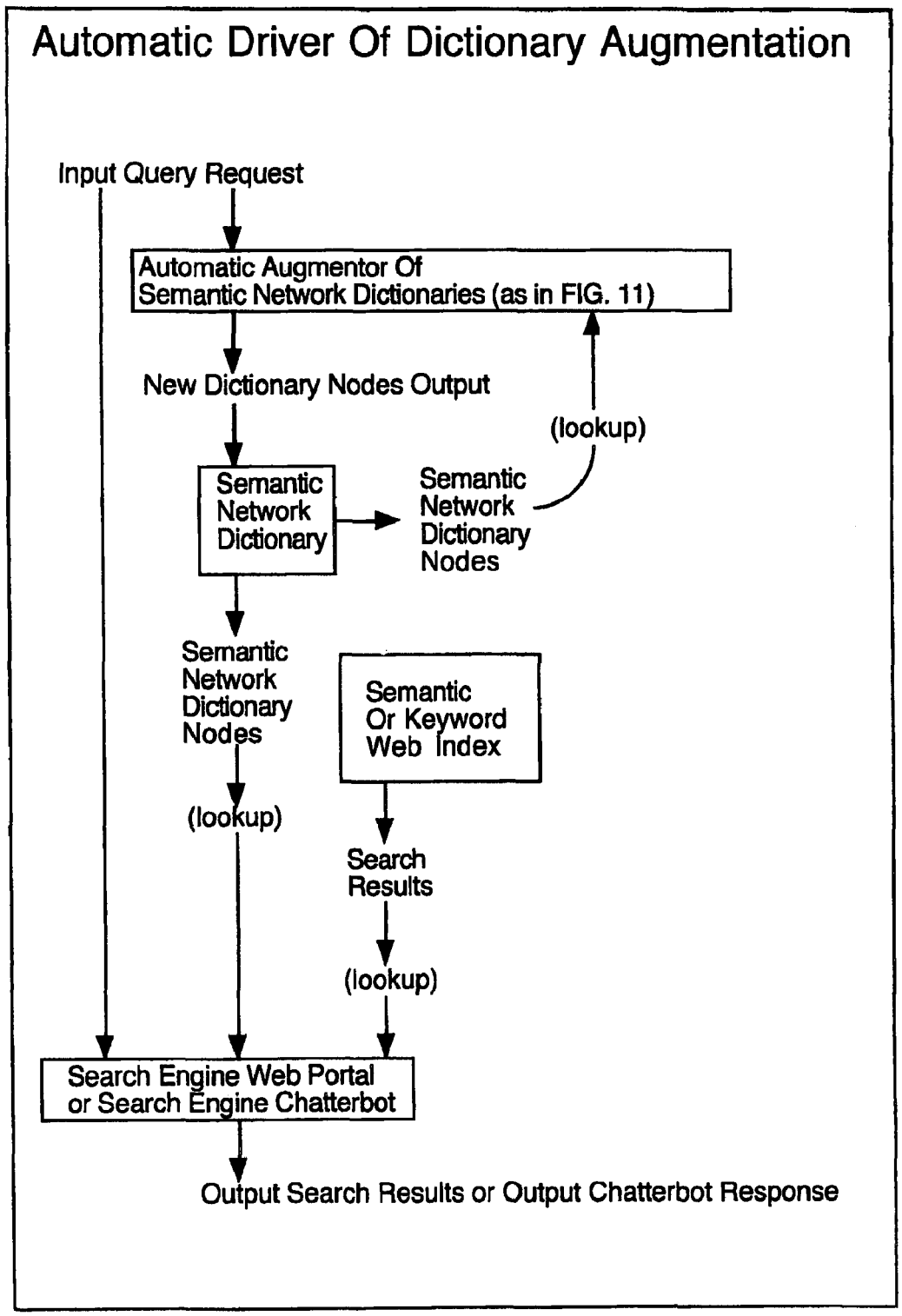
FIG. 12 shows a method for using the automatic augmenter of FIG. 11 for adding new vocabulary just before new vocabulary is needed by a search engine portal, in accordance with one embodiment of the present invention.

FIG. 12 shows the method of FIG. 11 deployed in a conversational user interface, in accordance with one embodiment. Input Query Request, which comes from an application user, is used as input to the method of FIG. 11 to automatically augment a semantic network dictionary. Semantic network nodes generated by the method of FIG. 11 join a Semantic Network Dictionary which is the basis of conversational or semantic search methods used by a Search Engine Web Portal or Search Engine Chatterbot. The Search Engine Web Portal or Search Engine Chatterbot looks up User Requests in the Semantic Network Dictionary to better understand from a semantic perspective what the User is actually Requesting. In this way, the Web Portal can avoid retrieving extraneous data corresponding to keywords which accidentally are spelled within the search request. For instance, a User Request of "token praise" passed to a keyword engine can return desired sentences such as "This memorial will last long past the time that token praise will be long forgotten." However a keyword engine or semantic engine missing vocabulary related the meaning of "token praise" will return extraneous sentences such as the child behavioral advice "Pair verbal praise with the presentation of a token" and the token merchant customer review of "Praise, tokens and coins shipped promptly and sold exactly as advertised ... four star rating." By just-in-time vocabulary augmentation as disclosed in FIG. 12, the meaning of "token praise" and other sophisticated semantic terms can be added to a semantic dictionary just-in-time to remove extraneous data from search result sets using methods disclosed b'./U.S. patent application Ser. No. 10/329,402. In addition, just-in-time vocabulary augmentation as disclosed in FIG. 12 can enable subsequent automatic categorization to be more accurate, by more accurately associating semantic synonyms and semantically relating spellings so they co-locations of meaning can accurately detected when calculating prevalence of meanings. More accurate association of semantic synonyms and semantically relating spellings also enables more accurate detection of Seed-by-Seed Descriptor Terms and Deprecated Terms in FIG. 3, by detecting Descriptor Terms and Deprecated Terms not only on the basis of co-located spellings, but co-located synonyms and co-located closely related meanings.

Figure 13:
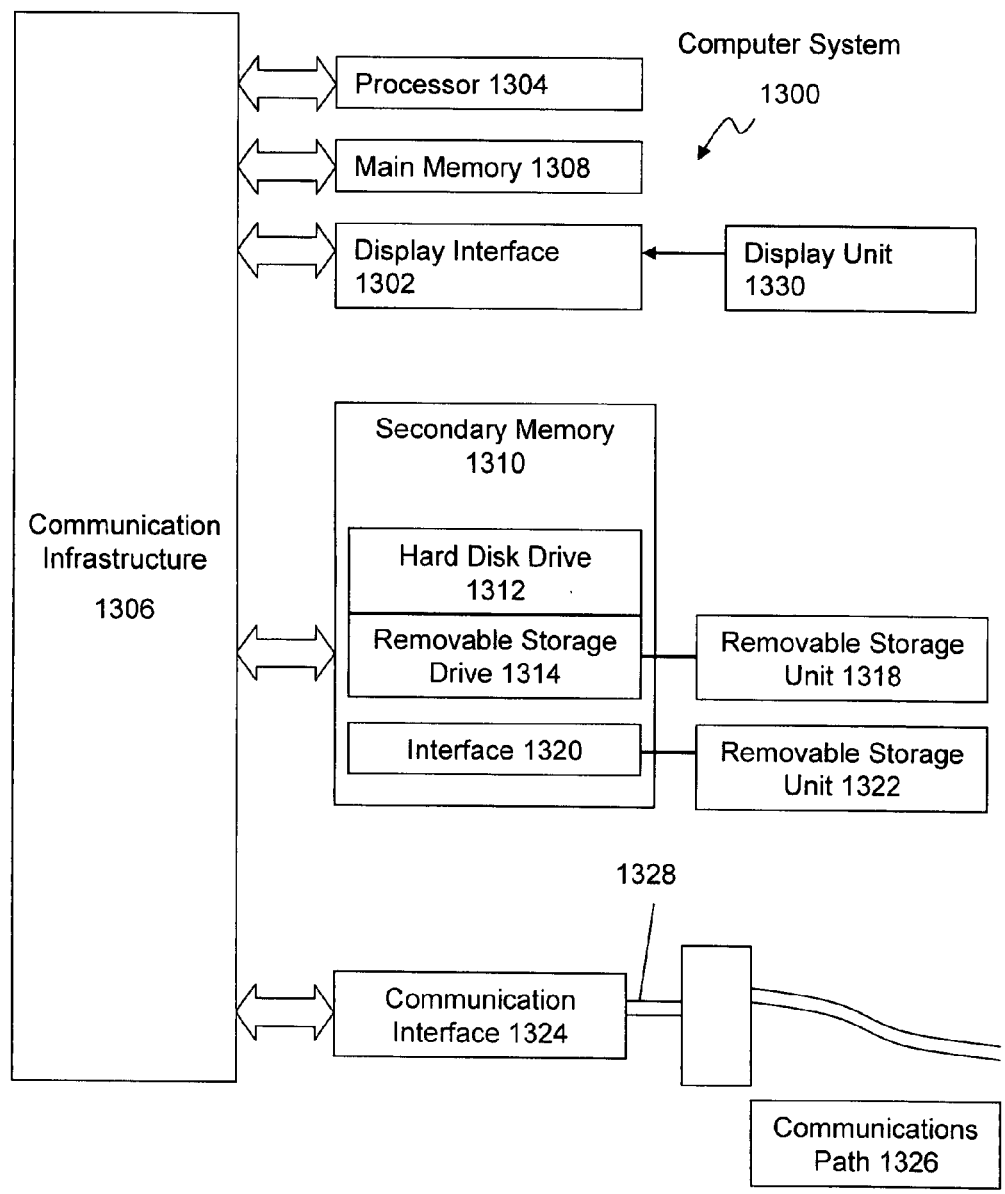
FIG. 13 presents an exemplary system diagram of various hardware components and other features, for use in accordance with an embodiment of the present invention.

The present invention may be implemented using hardware, software, or a combination thereof and may be implemented in one or more computer systems or other processing systems. In one embodiment, the invention is directed toward one or more computer systems capable of carrying out the functionality described herein. An example of such a computer system 1300 is shown in FIG. 13.

Computer system 1300 includes one or more processors, such as processor 1304. The processor 1304 is connected to a communication infrastructure 1306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1300 can include a display interface 1302 that forwards graphics, text, and other data from the communication infrastructure 1306 (or from a frame buffer not shown) for display on a display unit 1330. Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well-known manner. Removable storage unit 1318, represents a floppy disk, magnetic tape, optical disk, etc., which is read by and written to removable storage drive 1314. As will be appreciated, the removable storage unit 1318 includes a computer usable storage medium having stored therein computer software and/or data.

In alternative embodiments, secondary memory 1310 may include other similar devices for allowing computer programs or other instructions to be loaded into computer system 1300. Such devices may include, for example, a removable storage unit 1322 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1322 and interfaces 1320, which allow software and data to be transferred from the removable storage unit 1322 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328, which may be electronic, electromagnetic, optical or other signals capable of being received by communications interface 1324. These signals 1328 are provided to communications interface 1324 via a communications path (e.g., channel) 1326. This path 1326 carries signals 1328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1314, a hard disk installed in hard disk drive 1312, and signals 1328. These computer program products provide software to the computer system 1300. The invention is directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform the features of the present invention, as discussed herein. In particular, the computer programs, when executed, enable the processor 1310 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312, or communications interface 1320. The control logic (software), when executed by the processor 1304, causes the processor 1304 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 14:
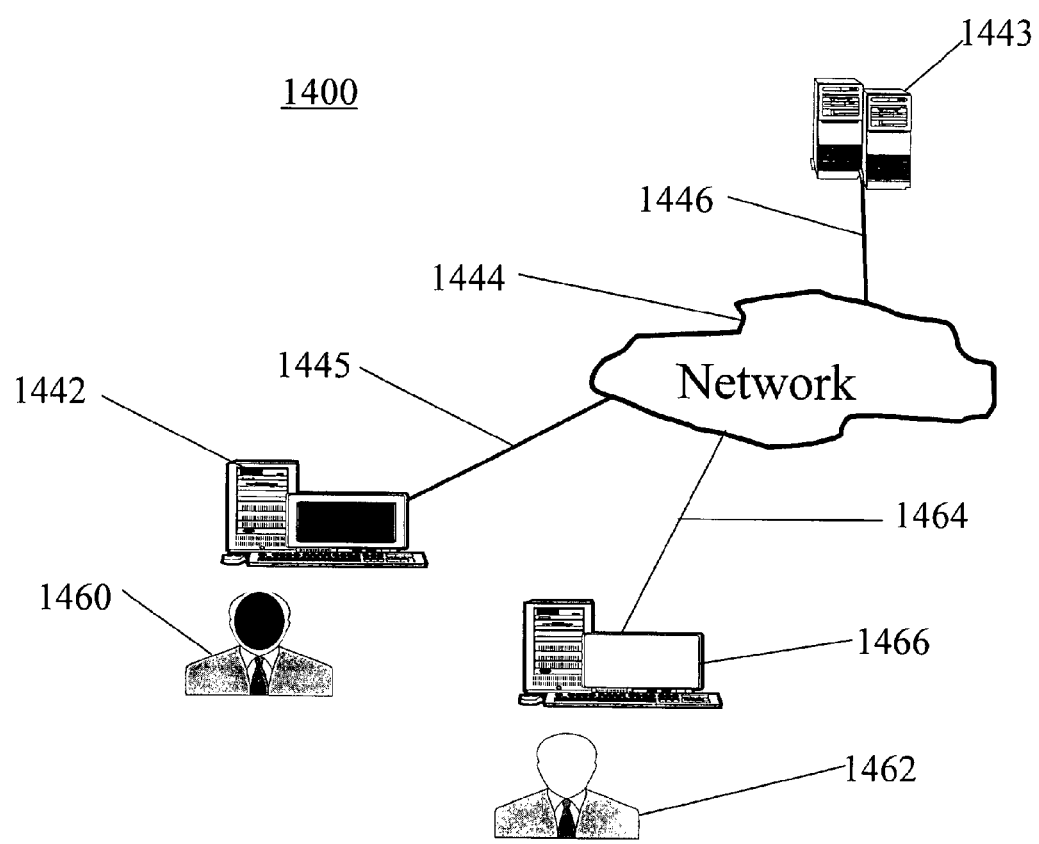
FIG. 14 is a block diagram of various exemplary system components, in accordance with an embodiment of the present invention.
Figure 5:
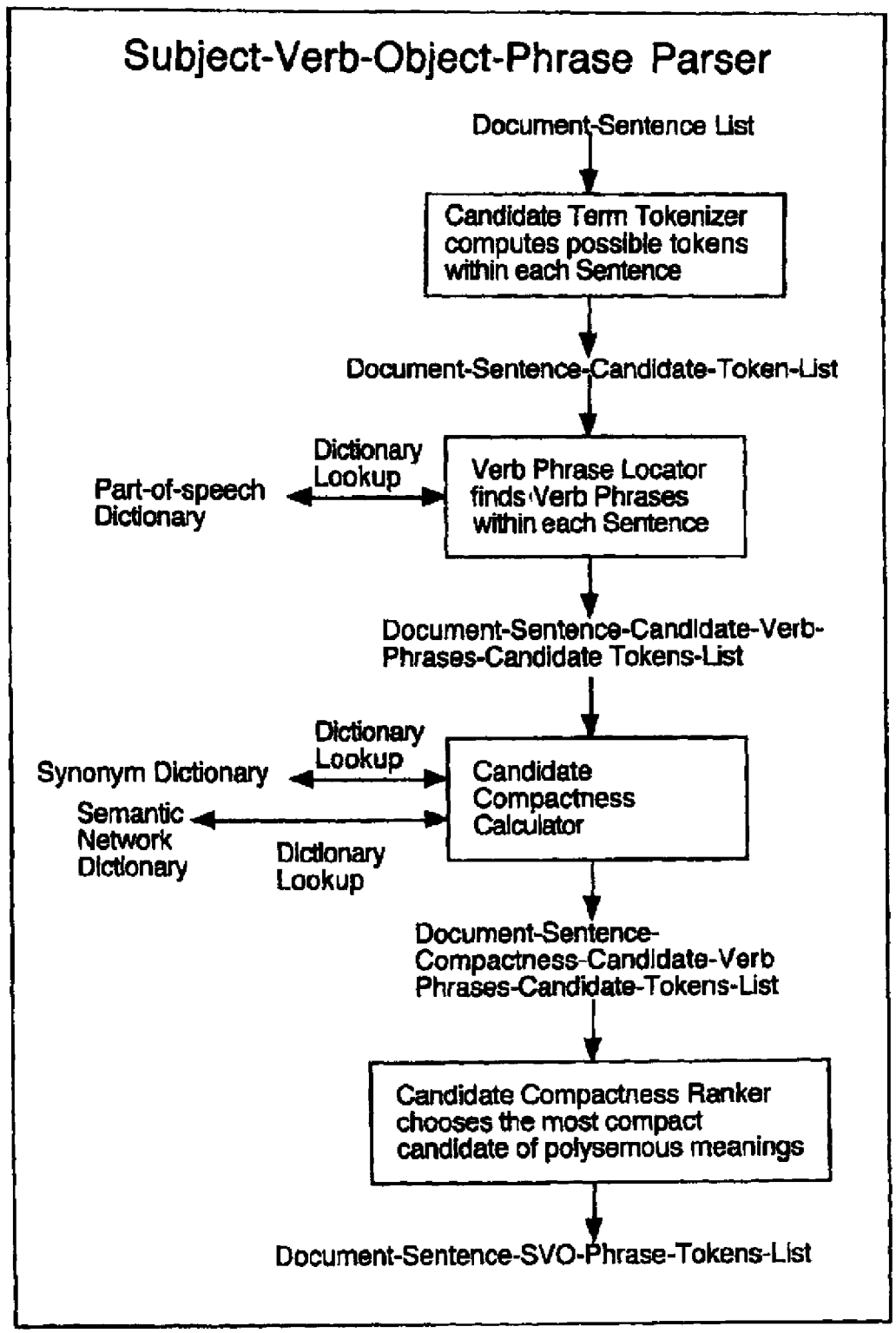

FIG. 14 shows a communication system 1400 usable in accordance with the present invention. The communication system 1400 includes one or more accessors 1460, 1462 (also referred to interchangeably herein as one or more "users") and one or more terminals 1442, 1466. In one embodiment, data for use in accordance with the present invention is, for example, input and/or accessed by accessors 1460, 1464 via terminals 1442, 1466, such as personal computers (PCs), minicomputers, mainframe computers, microcomputers, telephonic devices, or wireless devices, such as personal digital assistants ("PDAs") or a hand-held wireless devices coupled to a server 1443, such as a PC, minicomputer, mainframe computer, microcomputer, or other device having a processor and a repository for data and/or connection to a repository for data, via, for example, a network 1444, such as the Internet or an intranet, and couplings 1445, 1446, 1464. The couplings 1445, 1446, 1464 include, for example, wired, wireless, or fiberoptic links. In another embodiment, the method and system of the present invention operate in a stand-alone environment, such as on a single terminal.

While the present invention has been described in connection with preferred embodiments, it will be understood by those skilled in the art that variations and modifications of the preferred embodiments described above may be made without departing from the scope of the invention. Other embodiments will be apparent to those skilled in the art from a consideration of the specification or from a practice of the invention disclosed herein. It is intended that the specification and the described examples are considered exemplary only, with the true scope of the invention indicated by the following claims.

The invention claimed is:

1. A method, comprising:
    retrieving, by a computing device including a processor, a document set in response to receiving a query;
    parsing a semantic distance network according to a plurality of terms in the document set into a plurality of semantic term groups;
    determining respective balanced desirability values for respective semantic term groups of the plurality of semantic term groups, wherein the respective balanced desirability values comprise respective measures of prevalence of the respective semantic term groups as a function of respective measures of closeness of respective terms in the respective semantic term groups; and
    selecting a semantic term group of the respective semantic term groups as a category descriptor based on a balanced desirability value associated with the semantic term group.

2. The method of claim 1, further comprising
    augmenting the semantic distance network with the semantic term group.

3. The method of claim 1, wherein the parsing the semantic distance network further comprises:
    parsing the semantic distance network according to a semantic distance from a node of the semantic distance network to another node of the semantic distance network.

4. The method of claim 1, wherein the parsing the semantic distance network further comprises:
    parsing the semantic distance network according to a semantic distance from a first phrase of a first sentence to a second phrase of at least one of the first sentence or a second sentence.

5. The method of claim 1, wherein the selecting the semantic term group as the category descriptor further comprises:
    ranking the plurality of semantic term groups based upon the respective balanced desirability values; and
    selecting the semantic term group based on an associated ranking of a balanced desirability value of the semantic term group.

6. The method of claim 1, further comprising determining the respective measures of prevalence of the respective semantic term groups including determining a number of distinct terms of the plurality of terms that are co-located with the respective semantic term groups.

7. The method of claim 1, further comprising determining the respective measures of closeness of the respective terms of the respective semantic term groups including determining a first number of distinct terms of the plurality of terms that are co-located with at least two of the respective terms of the respective semantic term groups.

8. The method of claim 7, further comprising:
    determining a second number of other distinct terms that are co-located terms of the first number of distinct terms; and
    adding the second number to the first number to determine the respective measures of closeness.

9. The method of claim 1, further comprising determining the respective measures of prevalence of the respective semantic term groups including determining a number of occurrences of the respective semantic term groups in the document set.

10. The method of claim 1, further comprising weighting at least one of the respective measures of prevalence or the respective measures of closeness.

11. A system, comprising:
    means for retrieving a document set in response to a query;
    means for parsing a semantic distance network according to a set of terms in the document set into a set of semantic term groups;
    means for determining respective term values for respective semantic term groups of the set of semantic term groups, wherein the respective term values comprise respective measures of prevalence of the respective semantic term groups as a function of respective measures of closeness of respective terms in the respective semantic term groups;
    means for selecting a semantic term group of the respective semantic term groups as a category descriptor based on a term value associated with the semantic term group; and
    means for outputting the semantic term group in response to the semantic term group being selected.

12. The system of claim 11, further comprising:
    means for augmenting the semantic distance network with the semantic term group.

13. The system of claim 11, further comprising means for determining the respective measures of prevalence of the respective semantic term groups by determining a number of distinct terms of the plurality of terms that are co-located with the respective semantic term groups.

14. The system of claim 11, further comprising means for determining the respective measures of closeness of the respective terms of the respective semantic term groups by determining a first number of distinct terms of the plurality of terms that are co-located with at least two of the respective terms of the respective semantic term groups.

15. The system of claim 14, further comprising:
    means for determining a second number of other distinct terms that are co-located with terms of the first number of distinct terms; and
    means for adding the second number to the first number to determine the respective measures of closeness.

16. The system of claim 11, further comprising means for determining the respective measures of prevalence of the respective semantic term groups by determining a number of occurrences of the respective semantic term groups in the document set.

17. A non-transitory computer-readable medium having stored thereon computer executable instructions that, in response to execution by at least one computing device, cause the at least one computing device to perform operations comprising:
    retrieving a document set in response to receiving a request;
    parsing a semantic distance network according to a plurality of terms in the document set into a plurality of semantic term groups;
    determining respective optimization values for respective semantic term groups of the plurality of semantic term groups, wherein the respective optimization values comprise respective measures of dominance of the respective semantic term groups divided by respective measures of closeness of respective terms in the respective semantic term groups;
    selecting a semantic term group as a category descriptor based on an optimization value associated with the semantic term group; and
    responding to the request with the semantic term group.

18. The non-transitory computer-readable medium of claim 17, wherein the operations further:
    augmenting the semantic distance network with the semantic term group.

19. The non-transitory computer-readable medium of claim 17, wherein the operations further comprise determining the respective measures of dominance of the respective semantic term groups including determining a number of distinct terms of the plurality of terms that are co-located with the respective semantic term groups.

20. The non-transitory computer-readable medium of claim 17, wherein the operations further comprise determining the respective measures of closeness of the respective terms of the respective semantic term groups including determining a first number of distinct terms of the plurality of terms that are co-located with at least two of the respective terms of the respective semantic term groups.

21. The non-transitory computer-readable medium of claim 20, wherein the operations further comprise:
    determining a second number of other distinct terms that are co-located with terms of the first number of distinct terms; and
    adding the second number to the first number to determine the respective measures of closeness.

22. An apparatus, comprising:
a processor; and
a memory communicatively coupled to processor, the memory having stored therein computer-executable instructions, comprising:
- a semantic parser configured to parse a semantic distance network according to a plurality of terms in a document set into a plurality of semantic term groups; and
- a seed ranker configured to:
  - determine respective balanced desirability values for respective semantic term groups of the plurality of semantic term groups, wherein the respective balanced desirability values comprise respective measures of prevalence of the respective semantic term groups divided by respective measures of closeness of respective terms in the respective semantic term groups, and
  - select a semantic term group as a category descriptor based on a balanced desirability value associated with the semantic term group.

23. The apparatus of claim 22, wherein the seed ranker is further configured to augment the semantic distance network with the semantic term group.

24. The apparatus of claim 22, wherein the seed ranker is further configured to determine the respective measures of prevalence of the respective semantic term groups by a determination of a number of distinct terms of the plurality of terms that are co-located with the respective semantic term groups.

25. The apparatus of claim 22, wherein the seed ranker is further configured to determine the respective measures of closeness of the respective terms of the respective semantic term groups by a determination of a first number of distinct terms of the plurality of terms that are co-located with at least two of the respective terms of the respective semantic term groups.

26. The apparatus of claim 25, wherein the seed ranker is further configured to:
- determine a second number of other distinct terms that are co-located with terms of the first number of distinct terms, and
- add the second number to the first number to determine the respective measures of closeness.

* * * * *

UNITED STATES PATENT AND TRADEMARK OFFICE
CERTIFICATE OF CORRECTION

PATENT NO.           : 8,396,824 B2
APPLICATION NO.      : 11/806260
DATED                : March 12, 2013
INVENTOR(S)          : Au Page 1 of 2

It is certified that error appears in the above-identified patent and that said Letters Patent is hereby corrected as shown below:

On the Title Page, Item (56), under "OTHER PUBLICATIONS", in Column 2, Line 2, delete "Internation" and insert -- International --, therefor.

On Title Page 2, Item (56), under "OTHER PUBLICATIONS", in Column 2, Line 12, delete "Sematic" and insert -- Semantic --, therefor.

On Title Page 2, Item (56), undPage 1 of 1
er "OTHER PUBLICATIONS", in Column 2, Line 21, delete "Transistion" and insert -- Transition --, therefor.

In the Drawings

Delete Drawing Sheet 5, and replace with Drawing Sheet 5 as shown on attached sheet.

In the Specification

In Column 4, Line 10, delete "less then" and insert -- less than --, therefor.

In Column 4, Line 48, delete "form" and insert -- from --, therefor.

In Column 10, Line 18, delete "meaning" and insert -- meaning. --, therefor.

In Column 15, Line 65, delete "processor 1310" and insert -- processor 1304 --, therefor.

Signed and Sealed this
Eighteenth Day of March, 2014

Michelle K. Lee
*Deputy Director of the United States Patent and Trademark Office*